United States Patent
Luk et al.

(10) Patent No.: US 12,124,941 B2
(45) Date of Patent: Oct. 22, 2024

(54) METHODS AND APPARATUS FOR DYNAMIC BATCHING OF DATA FOR NEURAL NETWORK WORKLOADS

(71) Applicant: Intel Corporation, Santa Clara, CA (US)

(72) Inventors: Eric Luk, Dublin (IE); Mohamed Elmalaki, Gilbert, AZ (US); Sara Almalih, Scottsdale, AZ (US); Cormac Brick, San Francisco, CA (US)

(73) Assignee: Intel Corporation, Santa Clara, CA (US)

( * ) Notice: Subject to any disclaimer, the term of this patent is extended or adjusted under 35 U.S.C. 154(b) by 848 days.

(21) Appl. No.: 16/832,601

(22) Filed: Mar. 27, 2020

(65) Prior Publication Data

US 2020/0226453 A1 Jul. 16, 2020

(51) Int. Cl.
*G06N 3/063* (2023.01)
*G06N 3/04* (2023.01)
*G06N 3/08* (2023.01)

(52) U.S. Cl.
CPC .............. *G06N 3/063* (2013.01); *G06N 3/04* (2013.01); *G06N 3/08* (2013.01)

(58) Field of Classification Search
CPC ........... G06N 3/063; G06N 3/04; G06N 3/08; G06N 3/045
See application file for complete search history.

(56) References Cited

U.S. PATENT DOCUMENTS

| 11,961,000 | B2 * | 4/2024 | Holland | ................ | G06N 3/047 |
| 2020/0042856 | A1 * | 2/2020 | Datta | .................... | G06N 3/045 |
| 2020/0226458 | A1 * | 7/2020 | de Vangel | ............. | G06N 3/063 |

OTHER PUBLICATIONS

Li, Anthony Zhenyu. An Elastic, Parallel and Distributed Computing Architecture for Machine Learning. Diss. University of Warwick, 2019. (Year: 2019).*
Park, Jongsoo, et al. "Faster cnns with direct sparse convolutions and guided pruning." arXiv preprint arXiv:1608.01409 (2016). (Year: 2016).*
Oyama, Yosuke, et al. Toward training a large 3d cosmological cnn with hybrid parallelization. No. LLNL-CONF-778764. Lawrence Livermore National Lab.(LLNL), Livermore, CA (United States), 2019. (Year: 2019).*
Yao, Zhewei, et al. "Large batch size training of neural networks with adversarial training and second-order information." arXiv preprint arXiv:1810.01021 (2018). (Year: 2018).*
Ahn, Shinyoung, et al. "Soft memory box: A virtual shared memory framework for fast deep neural network training in distributed high performance computing." IEEE Access 6 (2018): 26493-26504. (Year: 2018).*

* cited by examiner

*Primary Examiner* — Miranda M Huang
*Assistant Examiner* — Sidney Vincent Bostwick
(74) *Attorney, Agent, or Firm* — Akona IP PC

(57) ABSTRACT

Examples to determine a dynamic batch size of a layer are disclosed herein. An example apparatus to determine a dynamic batch size of a layer includes a layer operations controller to determine a layer ratio between a number of operations of a layer and weights of the layer, a comparator to compare the layer ratio to a number of operations per unit of memory size performed by a computation engine, and a batch size determination controller to, when the layer ratio is less than the number of operations per unit of memory size, determine the dynamic batch size of the layer.

25 Claims, 7 Drawing Sheets

METHODS AND APPARATUS FOR DYNAMIC BATCHING OF DATA FOR NEURAL NETWORK WORKLOADS

BACKGROUND

Artificial intelligence (AI), including machine learning (ML), deep learning (DL), and/or other artificial machine-driven logic, enables machines (e.g., computers, logic circuits, etc.) to use a model to process input data to generate an output based on patterns and/or associations previously learned by the model via a training process. For instance, the model may be trained with data to recognize patterns and/or associations and follow such patterns and/or associations when processing input data such that other input(s) result in output(s) consistent with the recognized patterns and/or associations.

BRIEF DESCRIPTION OF THE DRAWINGS

The figures are not to scale. In general, the same reference numbers will be used throughout the drawing(s) and accompanying written description to refer to the same or like parts.

Figure 1:
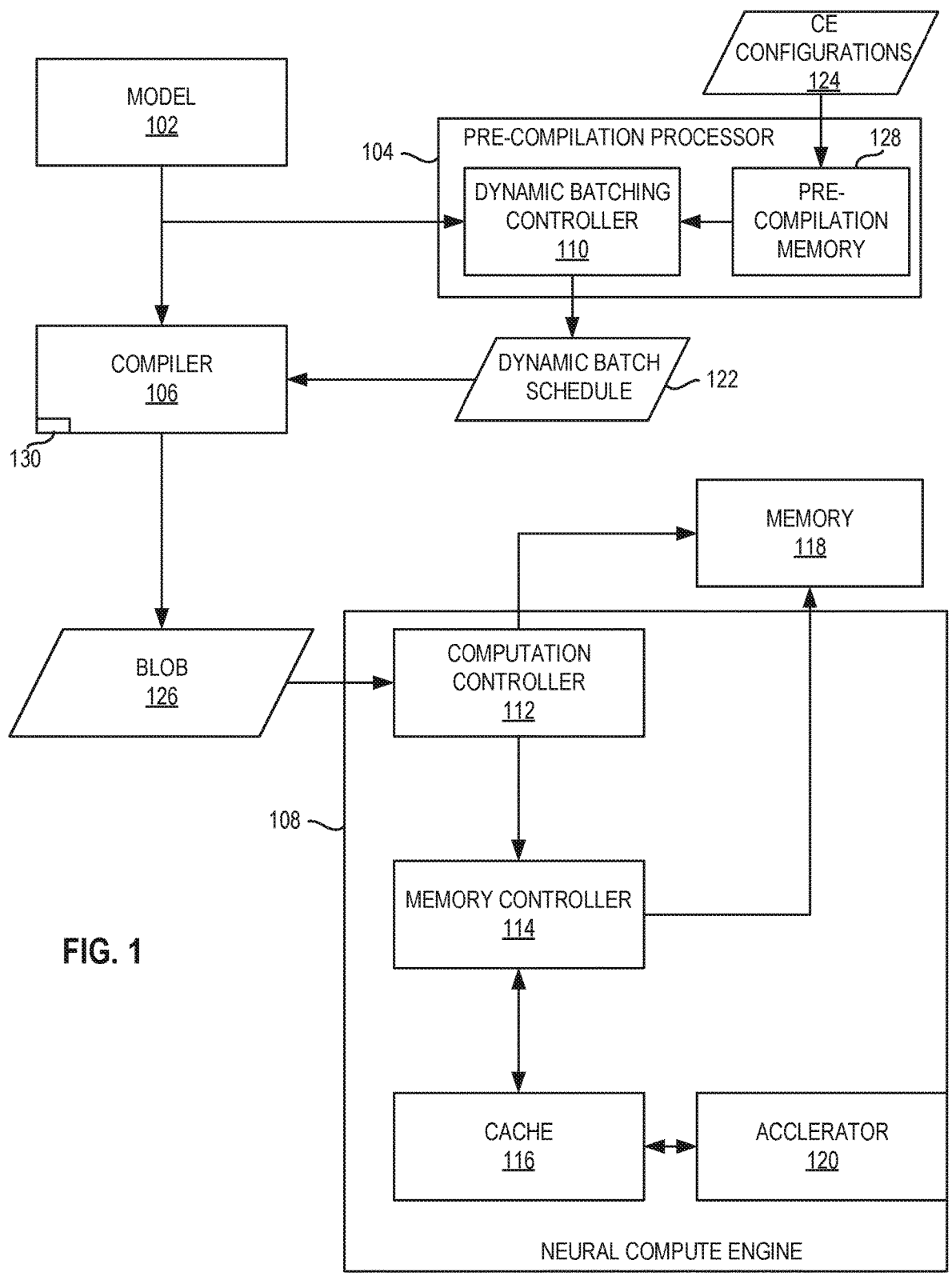
FIG. 1 illustrates an example dynamic batching controller to generate a batch schedule.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

In computer engineering, computing architecture is a set of rules and methods that describe the functionality, organization, and implementation of computer systems. Today's computing systems are expected to deliver near zero-wait responsiveness and superb performance while taking on large workloads for execution. Therefore, computing architectures have continually changed (e.g., improved) to accommodate increased workloads and performance expectations.

Examples of large workloads include neural networks, artificial intelligence (AI), machine learning, etc. Such workloads have become more prevalent as they have been implemented in a number of computing devices, such as personal computing devices, business-related computing devices, etc. With the growing use of these workloads (e.g., neural network workloads, machine learning workloads, AI workloads), new silicon, targeted at running large workloads, has been produced. Such new silicon includes dedicated hardware accelerators (e.g., graphics processing unit (GPU), field-programmable gate array (FPGA), vision processing unit (VPU), etc.) customized for processing data using data parallelism. Data parallelism is parallelization across multiple processors (e.g., central processing unit (CPU), GPU, FPGA, etc.) in parallel computing environments. Data parallelism focuses on distributing the data across different nodes (e.g., processing units), which operate on the data in parallel. Data parallelism can be referred to as batching and can be applied on data structures such as arrays and matrices by working on each element in parallel. Example data structures corresponding to large workloads include neural networks, machine learning models, etc.

Some accelerators (e.g., the VPU) include computation engines to execute neural network workloads. A neural compute engine (NCE), is hardware that is configured to run neural network workloads at high speeds and low power without compromising accuracy. In examples disclosed herein, neural network workloads are topologies represented as compute graphs that include nodes and edges. As used herein, nodes are primitive mathematical operations also referred to as layers, and edges are paths that inter-connect nodes and are represented as multidimensional arrays (e.g., tensors). In some examples, an NCE executes a topology on a per-layer basis such that the NCE executes each layer by performing the mathematical operations represented by the nodes and dataflow operations represented by the edges of that layer. An NCE executes a layer in four steps that run substantially in parallel: 1) reading an input activation tensor, 2) reading a parameter tensor. 3) executing a layer operation (e.g., performing convolution, fully connected, etc.), and 4) writing an output activation tensor. In some examples, the reading and writing steps are referred to herein as memory cycles and the executing steps are referred to herein as computation cycles.

Therefore, the NCE performs computation cycles and memory cycles during the execution of a layer. As used herein, performance is the speed at which the NCE executes the layer in a neural network workload. For example, the performance of the NCE is measured based on how the computing architecture of the NCE leverages the computing cycles versus the memory cycles. Thus, a relatively higher speed performance executes more compute cycles per memory access. A relatively lower speed performance executes fewer compute cycles per memory access. As used herein, the NCE is configured to perform a number of operations per unit of memory size. For example, the number of operations per unit of memory size refers to the number of computing cycles (e.g., processor cycles, CPU cycles, etc.) the NCE performs per memory cycle that is used to access a unit of memory size. In some instances, an example ideal goal of the NCE computing architecture is to compute more than store. However, there may be times when a topology includes a plethora of parameters and nodes (e.g., parameter tensors and activation tensors) of data to be read from the memory, therefore increasing the number of memory cycles. For example, parameter tensors and activation tensors for a specific topology may be large (e.g., include high numbers of tensors) enough to wholly prevent caching them in a cache. For example, a cache memory may not have sufficient capacity to store all the data of the layer, thus causing part of the data to remain in the main memory. In this manner, the computing architecture of the NCE utilizes more time reading in data parameters from the main memory into the cache memory instead of performing computations. In such examples, the large tensors are a key factor in decreasing NCE overall performance.

Prior techniques use static batching to improve the overall performance of topology execution. In static batching, the computing architecture of the NCE batches a topology to execute its layers as multiple inputs in parallel. When batching a neural network topology using static batching, a batch size may be allocated for all the layers. For example, a compiler may determine a batch size of two to specify that two inputs are executed in parallel for each layer. In some examples, this is beneficial. For example, when there are more memory cycles than computing cycles in the layer, executing two inputs at once may improve computation performance by reusing weights and activations fetched during the memory cycles for both inputs. For example, prior batching methods read in a set of parameters and determine that the parameters are used to compute a small set of information. Such instances result in an inefficient read. Prior solutions try to overcome such inefficient reads by computing as much input information as possible utilizing the parameters (e.g., also referred to as batching). This way, the number of compute cycles will be equal to or approximately equal to the number of memory cycles. In this manner, the performance is not limited by the memory cycles.

However, in some examples, it is not beneficial to have a static batch size of two. For example, an NCE may not have sufficient computing resources to compute two batches of input data and read in the parameter data. In such an examples, the NCE wastes more time on fetching parameter data from memory than processing the input batches. When the NCE spends more time fetching parameter data than processing data, latency is increased and sometimes power consumption increases.

For example, a topology includes four layers: layer one, layer two, layer three, and layer four. The NCE may be able to batch four inputs (e.g., batch size=4) for layer one due to the number of parameters in layer one. The NCE may be able to batch four inputs (e.g., batch size=4) for layer two, two inputs for layer three (e.g., batch size=2), and one input for layer four (e.g., batch size=1). In such an example, the compiler determines the global batch size to be four because it is the maximum batch size, which is static across all four layers in the topology. However, the static batch size of four is not optimal for layers three and four, because they do not require as many computing resources to read the parameters. Therefore, the computation time for layers three and four are less than the read time, which is inefficient.

Examples disclosed herein include a pre-compilation processor to determine a dynamic batch size per layer of a topology. For example, the pre-compilation processor includes a dynamic batching controller to analyze each layer of the topology and determine an optimum batch size for each layer. In examples disclosed herein, the pre-compilation processor generates information indicative of the batch size of the layer and provides the information to a compiler. In some examples, the pre-compilation processor determines a variable batch schedule at inference phase for each layer in the topology at compile time.

Additionally, examples disclosed herein determine a dynamic batch size if needed. For example, the pre-compilation processor does not determine a dynamic batch size for a layer that does not meet a batching condition. In some examples, when the pre-compilation processor determines that the number of operations of the layer and the weights of the layer are greater than the operations of the NCE, a batch size of one is assigned to the layer and the pre-compilation processor moves to the next layer. In such an example, the processing latency and power consumption of the pre-compilation processor is reduced.

FIG. 1 depicts an example system 100 to generate a dynamic batching schedule. FIG. 1 includes an example model 102, an example pre-compilation processor 104, an example compiler 106, an example neural compute engine 108, and an example memory 118. In FIG. 1, the example pre-compilation processor 104 includes an example dynamic batching controller 110 and an example pre-compilation memory 128. In FIG. 1, the example neural compute engine 108 includes an example computation controller 112, an example memory controller 114, an example cache 116, and an example accelerator 120.

In the illustrated example of FIG. 1, the system 100 compiles and executes the example model 102. The example model 102 is a neural network model including an input layer, one or more hidden layers, and an output layer. In some examples, the layers of the model 102 are trained and utilized to generate a prediction about a set of input data. For example, a convolutional neural network is a model utilized to generate a prediction about an image, such as contents of the image. For example, the model 102 can generate multiple probabilities indicative of likelihoods that the image includes a dog, a cat, a mouse, a bird, etc. The example model 102 is a trained neural network. For example, the model 102 has undergone a training phase.

In general, implementing a neural network system involves two phases, a learning/training phase and an inference phase. In the learning/training phase, a training algorithm is used to train the model to operate in accordance with patterns and/or associations based on, for example, training data. In general, the model includes internal parameters (e.g., the layers and weights) that guide how input data used to generate output data, such as through a series of nodes and connections within the model to generate output data based on features recognized in the input data. Additionally, hyperparameters are used as part of the training process to control how the learning is performed (e.g., a learning rate, a number of layers to be used in the model 102, etc.). As used herein, hyperparameters are training parameters that are determined prior to initiating the training process.

Once training is complete, the example model 102 is deployed for use as an executable construct that processes an input and provides an output based on the network of nodes and connections defined in the model. The example model 102 may be deployed at an edge environment, a cloud environment, and/or a local client device. The example model 102 may be accessed by a client device, compiled by a client device compiler (e.g., compiler 106), and executed by the client device compute engine (e.g., neural compute engine 108).

After the training phase, the deployed model may be operated in an inference phase to process data. In the inference phase, data to be analyzed (e.g., live data) is input to the example model 102, and the example model 102 executes to create an output. During the inference phase, the example model 102 implements machine-based "thinking" by analyzing the input data to generate the output based on what it learned from the training (e.g., by executing the model 102 to apply the learned patterns and/or associations to the live data). In some examples, input data undergoes pre-processing before being used as an input to the model 102. Moreover, in some examples, the output data may undergo post-processing after it is generated by the model 102 to transform the output into a useful result (e.g., a display of data, an instruction to be executed by a machine, etc.).

In some examples, an output of the deployed model 102 may be captured and provided as feedback to determine an accuracy of the deployed model 102. The feedback can trigger re-training of the example model 102 when the feedback indicates that the accuracy of the deployed model 102 is less than a threshold or other criterion. In such instances, the example model 102 can be re-trained using the feedback and an updated training data set, hyperparameters, etc., to generate an updated, deployed model.

The example model 102 may be any type of machine learning (ML) and/or Artificial Intelligence (AI) model. In some examples, the model 102 can be represented as a topology, where the topology is a graph including layers of nodes and edges. In the model 102, each layer obtains input data and may generate a successively higher-level abstraction of the input data. The layer utilizes activations (e.g., activation tensors, nodes, etc.) to generate the higher-level abstraction of the input data. In some examples, the first layer in the topology includes input activations that obtain the input data and apply operations to generate output activations. In some examples, the output activations are weighted sums of a previous layer. There can be multiple output activations depending on the number of layers in the topology. Each activation includes and/or otherwise is assigned one or more weights (e.g., weight tensors). In some examples, the weights connect the input activations to the output activations.

In some examples, the activations are a matrix of data. The matrix may be multi-dimensional or single-dimensional. For example, an input activation defined as a [6×6×3] input is indicative that the activation is a three-dimensional matrix. In some examples, the input activation is applied to an input image having a different matrix size (e.g., [244×244×3]). In this manner, the output activation corresponds to the weighted sum of the two matrices. In some examples, a new set of input activations and weights are applied to the previous output activations. In some examples, an input activation may be an image including multiple dimensions equal to [224×224×3], where '224×244' defines the width and the height of the image while '3' defines the input depth (e.g., a number of input channels) of the image. A four dimensional weight tensor of [7×7×3×64] is configured to convolve over the image (e.g., scan, multiply, add, subtract, values in the weight tensor to the image). In such a four dimensional weight tensor, '7×7' corresponds to the weight kernel size; '3' corresponds to the number of input channels that are to be matched with the number of input channels of the image; and '64' corresponds to the number of output channels of the resulting output tensor. In a stride equal to 1 (e.g., a convolving step discussed in further detail below in connection with FIG. 2), the output activation tensor has dimensions [224×224×64].

The topology may include densely connected layers and/or sparsely connected layers. In some examples, the densely connected layers are referred to as fully connected layers, in which each node (e.g., activation) of a layer is connected to all nodes (e.g., output activation) of an adjacent layer. In this manner, information is passed between every node more than once. In some examples, a sparsely connected layer is a layer that includes nodes not connected to every node of an adjacent layer. In some examples, a topology including hundreds to thousands of densely connected layers may not fit in an internal memory (e.g., the example cache 116) and, thus, is divided into two memories (e.g., the example cache 116 and the example memory 118). In this manner, the example accelerator 120 may take a longer time to compile and execute the topology due to reading data (e.g., activations and weights) from the memory 118 into the cache 116. Accordingly, such a topology can benefit from batch processing, depending on the size (e.g., the number of bytes) of the layer to decrease the time it takes to execute (e.g., process) the model 102. As used herein, batch processing or batching is the process of executing one or more inputs in parallel.

In the illustrated example of FIG. 1, the example system 100 includes the example pre-compilation processor 104 to determine a dynamic batch schedule 122. The example dynamic batch schedule 122 is to configure the neural compute engine 108 to process different batches using the model 102. As used herein, a batch schedule and/or a batching schedule is a timeline utilized to schedule batches of input data for subsequent processing by the neural compute engine 108. For example, the pre-compilation processor 104 parses the model 102 into layers. The pre-compilation processor 104 determines a batch size of input data to be input to the layers. The batch refers to input data to be compiled and executed in a parallel manner by the neural compute engine 108. A batch size is the number of inputs to be processed in the layer. The example pre-compilation processor 104 may determine layers that can obtain a batch size greater than one. In some examples, the dynamic batch schedule 122 is indicative of an execution order of the batches, the execution order followed by the neural compute engine 108. For example, the pre-compilation processor 104 may queue the batches in a successive order. In some examples, the pre-compilation processor 104 may queue the batches in parallel queues to process input data of multiple batches in parallel.

In some examples, the pre-compilation processor 104 is a processor that obtains the example model 102 and compares parameters of the model 102 to compute engine (CE) configurations 124 to determine batch sizes. As used herein, CE configurations 124 are values corresponding to computing resources of the example neural compute engine 108. The CE configurations 124 are described in further detail below. In some examples, the pre-compilation processor 104 intercepts the model 102 before the compiler 106 compiles the model 102. In some examples, the pre-compilation processor 104 is independent of the neural compute engine 108, any hardware acceleration utilized to execute the model 102, the compiler 106, and/or any compiler technologies utilized to compile the model 102. Alternatively, in some examples, the pre-compilation processor 104 is included as a part of the neural compute engine 108 or the compiler 106.

In the illustrated example of FIG. 1, the example pre-compilation processor 104 includes the dynamic batching controller 110 to determine a dynamic batching condition of the model 102 and generate a dynamic batch schedule 122. The example dynamic batching controller 110 may be in communication with the example model 102, the example compiler 106, and/or the example neural compute engine 108. In some examples, the dynamic batching controller 110 is deployed in a cloud environment, in an edge environment, and/or in an endpoint environment. In some examples, the dynamic batching controller 110 generates dynamic batch sizes instead of a static batch size for the model 102. In some examples, the dynamic batching controller 110 reduces the processing latency of the neural compute engine 108 and optimizes the power consumption of the neural compute engine 108 during model execution. The example dynamic batching controller 110 is described in further detail below in connection with FIG. 2.

In the illustrated example of FIG. 1, the example pre-compilation processor 104 includes the example pre-compilation memory 128 to collect, store, and/or provide compute engine configurations 124. In some examples, the CE configurations 124 are copied from the example memory 118 to the pre-compilation memory 128 (e.g., by the pre-compilation processor 104). In some examples, the example neural compute engine 108 stores the CE configurations 124 in the pre-compilation memory 128. For example, the neural compute engine 108 may include a metadata file or an abstraction of the resources of the neural compute engine 108 and provide the information (e.g., metadata file, abstraction, etc.) to the pre-compilation processor 104 for storing in the pre-compilation memory 128. In such an example, the pre-compilation processor 104 and/or the pre-compilation memory 128 may be communicatively coupled to the example neural compute engine 108 via network connections.

In some examples, an external source (e.g., an external and/or remote server) stores the CE configurations 124 in the pre-compilation memory 128. In such an example, a user (e.g., an administrator, an owner, etc.) of the neural compute engine 108 may provide a file (e.g., a package of data) including the CE configurations 124 to the example pre-compilation memory 128. The example pre-compilation memory 128 can be accessed by the example dynamic batching controller 110 such that the example dynamic batching controller 110 can obtain and utilize the CE configurations 124.

In the illustrated example of FIG. 1, the example system 100 includes the example compiler 106 to generate an example blob 126. The example compiler 106 may obtain the example model 102, the example dynamic batch schedule 122, and the example CE configurations 124 to generate the example blob 126. The example compiler 106 may transform the example model 102 from a programming language in which the model 102 was received to a machine-readable language that the neural compute engine 108 can understand and execute. For example, the compiler 106 may generate an executable graph including instructions to configure the neural compute engine 108 to execute the model 102. In some examples, the compiler 106 utilizes the dynamic batch schedule 122 to generate the executable graph. For example, the compiler 106 may utilize the dynamic batch schedule to divide the layers into batches based on the dynamic batch schedule 122. In other examples, the compiler 106 may utilize the dynamic batch schedule 122 to assign nodes and edges of the model 102 to hardware (e.g., cores of the example accelerator 120) and storage locations.

In the illustrated example of FIG. 1, the example compiler 106 includes a compiler memory 130 to store transformations of the example model 102. For example, the compiler memory 130 may store the example blob 126.

In the illustrated example of FIG. 1, the example blob 126 is a graph file including a dataflow graph and metadata indicative of characteristics of the example model 102. For example, the dataflow graph includes instructions defining the operations of nodes in the model 102 and defining how edges of the model 102 connect the nodes to different nodes. The metadata in the example blob 126 specifies batch sizes, activation tensors, weight tensors, associated linked lists for the tensors' storage locations (e.g., storage element pointers, weight pointers, etc.), etc. In some examples, the compiler 106 provides the blob 126 to the neural compute engine 108. Alternatively, the example compiler 106 stores the blob 126 in a compiler memory (e.g., located in main memory) accessible by the example neural compute engine 108.

In the illustrated example of FIG. 1, the example system 100 includes the example neural compute engine 108 to execute the example model 102 by dynamic batch processing. The example neural compute engine 108 is hardware, configured to run neural networks (e.g., the model 102) based on the data and instructions in the blob 126. In some examples, the neural compute engine 108 implements a vision processing unit (VPU) (e.g., the accelerator 120). The example neural compute engine 108 includes a plurality of computing resources to execute neural network workloads. In some examples, these resources make up the CE configurations 124. For example, the neural compute engine 108 is configured to include a frequency for which to operate at, a number of operations per second (OPS), a number of deep learning processing units (DPUs) per VPU, a number of multiple and accumulate (MAC) processing elements (MPE) per DPU, memory bandwidth (BW), a size of the cache 116, and tera operations per second (TOPs) or giga operations per second (GOPs). Therefore, the CE configurations 124 are the values associated with the computing resources mentioned above. For example, the CE configurations 124 indicate that the neural compute engine 108 has the ability to compute 1 TOPs, 450 GB/s of BW, etc.

The example neural compute engine 108 is in communication with the example pre-compilation processor 104 and/or the example compiler 106. In some examples, the neural compute engine 108 is utilized at an edge device, at an endpoint device, and/or at a cloud data center. In some examples, an endpoint device, operated by a user, may accelerate the workload of the model 102 to the example neural compute engine 108. For example, a compute engine (e.g., the neural compute engine 108) implemented at an edge device, may be registered to obtain and execute workloads from registered endpoint devices. In this manner, the endpoint devices can offload larger (e.g., laborious) workloads from endpoint device hardware to edge hardware for processing and execution to save power consumption, optimize latency, etc.

In the illustrated example of FIG. 1, the example neural compute engine 108 includes the example computation controller 112 to store weights, activations, and associated data items in the example memory 118. The example computation controller 112 obtains the example blob 126. For example, the computation controller 112 reads the blob 126 from the compiler memory 130. The example computation controller 112 stores data (e.g., weights, inputs, activation tensors, etc.) in the example memory 118 for subsequent reading. For example, the computation controller 112 controls weight fetching (e.g., reading weights from the memory 118) and additionally directs the accelerator 120 to compute batches of input data during workload computation. The example computation controller 112 analyzes the blob 126 to determine where and when to fetch weights and activation tensors from the memory 118. For example, the computation controller 112 utilizes the linked lists and batch schedule 122, provided by the blob 126, to inform the example memory controller 114 to fetch the weights and activation tensors from the memory 118.

In the illustrated example of FIG. 1, the example system 100 includes the example memory 118 to store weights and activation tensors corresponding to the model 102. For example, the memory 118 stores operations, weight values, etc. In some examples, the memory 118 is a dynamic random access memory (DRAM) that stores each bit of data in a memory cell. Random access allows the example memory controller 114 to access any part of the memory 118 directly, rather than proceeding sequentially from a starting place. Alternatively, the example memory 118 is any other type of internal memory (e.g., flash memory, random-access memory (RAM), static RAM (SRAM), etc.).

In the illustrated example of FIG. 1, the example neural compute engine 108 includes the example memory controller 114 to send and/or receive data directly to and/or from the memory 118. For example, the memory controller 114 obtains weights and activations from the memory 118 in response to a notification from the computation controller 112. In some examples, the memory controller 114 stores batches of input data in the cache 116 based on the batch schedule 122, such that the batches are queued up in the cache 116 for retrieval by the example accelerator 120. The example memory controller 114 is in communication with the example computation controller 112, the example cache 116, and the example memory 118.

In the illustrated example of FIG. 1, the example neural compute engine 108 includes the example cache 116 to temporarily store data (e.g., weights, batches, etc.) for use by the example accelerator 120. For example, the cache 116 is a buffer between the memory 118 and the example accelerator 120 because the cache 116 stores data and instructions so that they are immediately available to the accelerator 120 when needed. In some examples, the cache 116 may be independent of the memory 118. Alternatively, the example cache 116 may be included as a portion of the memory 118. For example, the computation controller 112 and/or the example memory controller 114 may determine a portion of the memory 118 to be used as the cache 116 for memory caching. In some examples, the cache 116 is SRAM.

In the illustrated example of FIG. 1, the example neural compute engine 108 includes the example accelerator 120 to execute dynamic batches of data. The example accelerator 120 is configured to be coupled to the example cache 116. The example accelerator 120 is hardware configured to execute the batches of data based on commands and/or instructions provided by the example computation controller 112. In some examples, the accelerator 120 is a VPU configured to accelerate machine vision tasks (e.g., the workload of the model 102). In some examples, the accelerator 120 is a GPU, an FPGA, a CPU, an application-specific integrated circuit (ASIC), etc. In some examples, the accelerator 120 may include a plurality of accelerator units, such as a plurality of processing units (GPUs, FPGAs, VPUs, CPUs, ASICs, etc.) for batch processing.

In some examples, the example computation controller 112, the example memory controller 114, the example cache 116, and the example memory 118, and the example accelerator 120 of the example neural compute engine 108 are computing resources. The example CE configurations 124 may include information corresponding to the example computation controller 112, the example memory controller 114, the example cache 116, the example memory 118, and the example accelerator 120. In such examples, the CE configurations 124 include a bandwidth size of the example memory 118, a performance of the example accelerator 120 in operations per second, a clock speed at which the example accelerator 120 executes tasks in hertz (GHz), etc. In this manner, the example neural compute engine 108 may be a factor in determining the batch size of the model 102. For example, the CE configurations 124, indicative of the neural compute engine 108, determine how much data can be stored in the cache 116 before having to transfer data from the memory 118 to the cache 116, thus increasing computation latency.

Figure 2:
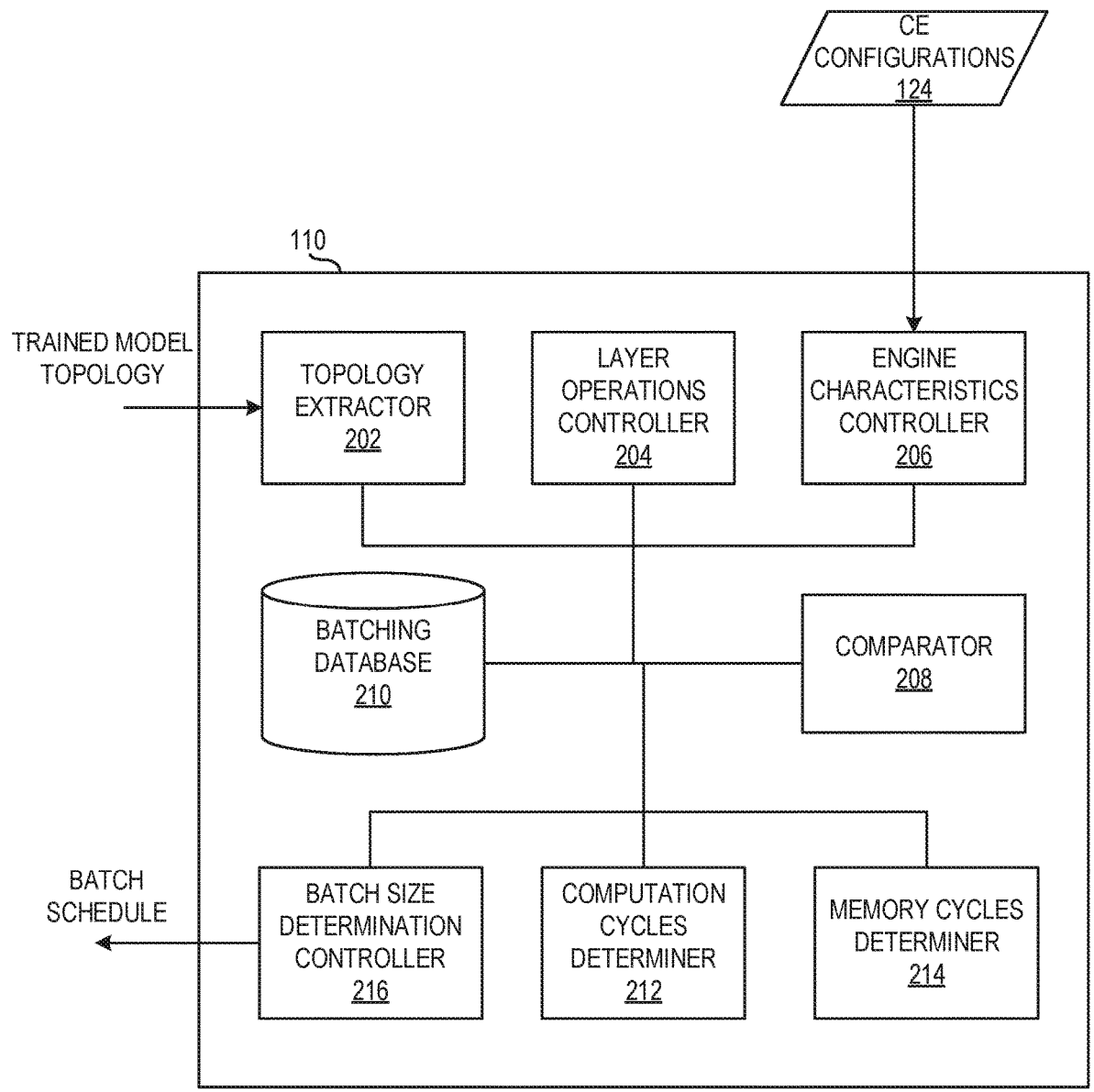
FIG. 2 illustrates an example block diagram of the dynamic batching controller of FIG. 1.

FIG. 2 illustrates an example block diagram of the example dynamic batching controller 110 of FIG. 1. The example dynamic batching controller 110 includes an example topology extractor 202, an example layer operations controller 204, an example engine characteristics controller 206, an example comparator 208, an example batching database 210, an example computation cycles determiner 212, an example memory cycles determiner 214, and an example batch size determination controller 216.

In the illustrated example of FIG. 2, the example dynamic batching controller 110 includes an example topology extractor 202 to extract layers and topology information from the example model 102. The example topology extractor 202 obtains the trained model topology from the model 102. For example, the topology extractor 202 may be communicatively coupled to the example model 102 via a network communication. The example topology extractor 202 parses the model 102 into layers including nodes and edges. For example, the topology extractor 202 utilizes a parser, such as a compiler or interpreter, to break data down into smaller elements for simple translation.

In some examples, the topology extractor 202 extracts parameter data. As used herein, parameter data is indicative of the size (e.g., bit size, byte size) or shape of activation tensors of the layer and the size (e.g., bit size, byte size) of the weights in the layer. In some examples, an input activation tensor is a 2-dimensional or 3-dimensional matrix, referred to as an input channel. In a layer, there may be a plurality of input channels. The number of input channels can be defined as C. An input channel includes a vertical dimension (e.g., a number of matrix rows) and a horizontal dimension (e.g., a number of matrix columns). The vertical dimension can be defined as H and the horizontal dimension can be defined as W.

In some examples, the topology extractor 202 extracts the weights of the layer, also referred to as filters. A filter, or weight, is a single dimensional or multi-dimensional matrix, also referred to as a kernel. Kernels perform operations (e.g., multiplication, addition, subtraction, division) on input channels. A kernel includes a vertical dimension ($F_h$) and a horizontal dimension ($F_w$). A kernel may convolve over an input channel to generate an activation output. During convolution, the kernel has a stride S, where the stride determines the size of the activation output. Each layer of the topology may include input channels, kernels, and activations. The sum of the activation outputs is equal to a depth K. The depth of the activation outputs is the volume of the layer and can be set to any value with increasing values for every layer added in the topology.

The example topology extractor 202 provides the parameter data to the example layer operations controller 204. For example, the topology extractor 202 is communicatively coupled to the example layer operations controller 204 via wired connection and/or a wireless connection. Alternatively, the example topology extractor 202 stores the parameter data in the example batching database 210. For example, the topology extractor 202 is communicatively coupled to the example layer operations controller 204 via wired connection and/or a wireless connection. The example topology extractor 202 extracts parameter data for every layer in the model 102.

In the illustrated example of FIG. 2, the example dynamic batching controller 110 includes the example layer operations controller 204 to determine a total number of operations of a selected layer in the topology and a value of weights for the selected layer. The example layer operations controller 204 obtains parameter data from the example topology extractor 202. Alternatively, the example layer operations controller 204 obtains parameter data from the example batching database 210. The example layer operations controller 204 determines the weight size, in bytes, of the layer utilizing the parameter data. For example, the layer operations controller 204 determines a weight size, in bytes, utilizing Equation 1 below. In Equation 1, K represents the depth of the output layer, C represents the number of input channels in the layer, $F_h$ represents the vertical dimension of the kernels in the layer, and $F_w$ represents the horizontal dimension of the kernels in the layer. Equation 1 may be repeated when a new layer is analyzed and/or otherwise selected by the example layer operations controller 204.

$$\text{weight} = K \times C \times F_h \times F_w \quad \text{Equation 1}$$

The example layer operations controller 204 may provide the weight size to the example comparator 208. Alternatively, the example layer operations controller 204 stores the weight size in the batching database 210 with a corresponding layer identifier.

The example layer operations controller 204 determines the total number of operations of a layer utilizing the parameter data. For example, the layer operations controller 204 determines the total number of operations of a layer utilizing Equation 2 below. In Equation 2, K represents the depth of the output layer, C represents the number of input channels in the layer, $H_o$ represents the vertical dimension of the output activation map of the layer, $W_o$ represents the horizontal dimension of the output activation map of the layer, $F_h$ represents the vertical dimension of the kernels in the layer, and $F_w$ represents the horizontal dimension of the kernels in the layer. Equation 2 below may be used and repeated over multiple iterations when a new layer is analyzed and/or otherwise selected by the example layer operations controller 204.

$$\text{total number of ops} = 2 \times (K \times C \times H_o \times W_o \times F_h \times F_w + K) \quad \text{Equation 2}$$

The example layer operations controller 204 may provide the total number of operations of the layer to the example comparator 208. Alternatively, the example layer operations controller 204 stores the total number of operations of the layer in the batching database 210 with a corresponding layer identifier.

The example layer operations controller 204 determines a layer ratio of the total number of operations of the layer to the weights of the layer utilizing the results of Equations 1 and 2. For example, the layer operations controller 204 determines the layer ratio of the layer utilizing Equation 3 below.

$$\text{Layer ratio} = \text{total number of operations}/\text{weights} \quad \text{Equation 3}$$

The example layer operations controller 204 may provide the layer ratio of the layer to the example comparator 208. Alternatively, the example layer operations controller 204 stores the layer ratio in the batching database 210 with a corresponding layer identifier.

In the illustrated example of FIG. 2, the example dynamic batching controller 110 includes the example engine characteristics controller 206 to determine resource data of the example neural compute engine 108. The example engine characteristics controller 206 obtains the CE configurations 124 from the example pre-compilation memory 128 to determine the resource data of the example neural compute engine 108.

The example engine characteristics controller 206 determines operations of the example neural compute engine 108 utilizing the CE configurations 124. For example, the engine characteristics controller 206 determines the operations the example neural compute engine 108 can perform utilizing Equation 4 below. In Equation 4, opsDevice represents the number of operations the example accelerator 120 can perform, nMAC represents a number of MPE per processing unit (e.g., a number of MAC processing elements per DPU), and nDevice represents a number of processing units per compute engine (e.g., the neural compute engine 108). For example, a processing unit architecture (e.g., the accelerator 120) includes 256 MAC units per device and 20 devices (DPUs) per processing unit. In such an example, the processing unit can provide two operations per MAC unit (e.g., 2×256×20 operations).

$$\text{opsDevice} = 2 \times n\text{MAC} \times n\text{Device} \quad \text{Equation 4}$$

The example engine characteristics controller 206 may store the operations of the example neural compute engine 108 in the batching database 210 with a corresponding accelerator identifier.

The example engine characteristics controller 206 determines operations per second (e.g., tera operations per second) of the neural compute engine 108 utilizing the CE configurations 124. For example, the engine characteristics controller 206 determines the operations per second of the neural compute engine 108 utilizing Equation 5 below. In Equation 5, opsDevice represents the number of operations of the accelerator 120 and deviceFreq represents the clock speed at which the example accelerator 120 executes tasks in hertz (e.g., megahertz (MHz)).

$$\text{TOPs} = \text{opsDevice} \times \text{deviceFreq} \quad \text{Equation 5}$$

In the example described above, a processing unit includes 256 MAC units, 20 devices (DPUs), and provides two operations per MAC unit. Utilizing Equation 5 above, the computation power (e.g., operations per second) of the processing architecture can be determined for these example values. For example, if such a processing unit operates at 700 MHz, the computation power of the processing unit is equal to 2×256×20×700,000,000=7,168,000,000,000 (e.g., 7.168 TOPs). The example engine characteristics controller 206 may provide the operations per second to the example comparator 208. Alternatively, the example engine characteristics controller 206 stores the operations per second of the accelerator 120 in the batching database 210 with a corresponding accelerator identifier.

The example engine characteristics controller 206 determines the operations per byte of the example neural compute engine 108. As used herein, operations per byte are the operations delivered for each byte of parameters configured to be transferred from the memory 118 to the example accelerator 120. For example, the accelerator 120 performs a number of operations while reading a byte of data from memory. The engine characteristics controller 206 can determine the operations per byte of the neural compute engine 108 utilizing Equation 6 below. In Equation 6, ddrBW represents the bandwidth, or the double data rate bandwidth size, of the example memory 118 in gigabytes per second (GB/s).

$$opsPerByte = \frac{TOPs}{ddrBW \times 10^9} \quad \text{Equation 6}$$

The example engine characteristics controller 206 may provide the operations per byte to the example comparator 208. Alternatively, the example engine characteristics controller 206 stores the operations per byte of the neural compute engine 108 in the batching database 210 with a corresponding compute engine identifier.

In the illustrated example of FIG. 2, the example dynamic batching controller 110 includes the example comparator 208 to determine a batching condition of the selected layer. The example comparator 208 obtains the layer ratio from the example layer operations controller 204 and the operations per byte from the example engine characteristics controller 206. In some examples, the comparator 208 obtains the layer ratio and the operations per byte from the example batching database 210. The example comparator 208 determines a batching condition for the selected layer utilizing Equation 7 below.

$$\text{batching condition} = \text{layer ratio} < \text{opsPerByte} \quad \text{Equation 7}$$

The example comparator 208 utilizes the batching condition to determine whether a dynamic batch size is to be determined for the layer or whether the batch size is equal to one. For example, when the batching condition is true (e.g., Equation 7 above is satisfied), the comparator 208 notifies the example computation cycles determiner 212 and the example memory cycles determiner 214 to begin the process of selecting a dynamic batch size for the layer. In other examples, when the batching condition is not true (e.g., Equation 7 above is not satisfied), the comparator 208 notifies the example batch size determination controller 216 that the layer batch size is equal to one.

In this illustrated example of FIG. 2, the example dynamic batching controller 110 includes the example batching database 210 to store useful values computed by and utilized by the example layers operations controller 204, the example engine characteristics controller 206, the example comparator 208, the example computation cycles determiner 212, the example memory cycles determiner 214, and/or the example batch size determination controller 216. In some examples, the batching database 210 is memory such as a DRAM, RAM, SRAM, ROM, etc. In some examples, the batching database 210 stores dynamic batch sizes determined by the example batch size determination controller 216 for subsequent generation of the dynamic batch schedule 122. For example, the dynamic batch schedule 122 is generated after the batch sizes for the layers have been determined.

In this illustrated example of FIG. 2, the example dynamic batching controller 110 includes the example computation cycles determiner 212 to determine a number of computation cycles configured to occur in the selected layer. The example computation cycles determiner 212 is initiated when the example comparator 208 determines a batching condition is true. For example, the computation cycles determiner 212 does not determine the number of computation cycles configured to occur in the selected layer when the layer ratio of the selected layer is greater than operations per byte of the neural compute engine 108.

The example computation cycles determiner 212 obtains, from the example batching database 210, the number of operations of the example accelerator 120 and the number of operations of the layer. For example, the computation cycles determiner 212 queries the batching database 210 for information corresponding to the neural compute engine 108 (e.g., the opsDevice of the neural compute engine 108) and information corresponding to the layer (e.g., total number of operations of the layer). The example computation cycles determiner 212 determines the number of computation cycles configured to occur utilizing the information from the batching database 210. For example, the computation cycles determiner 212 determines the number of computation cycles configured to occur utilizing Equation 8 below. In some examples, the computation cycles determiner 212 may utilize Equation 8 for every selected layer.

$$compCycles = \frac{\text{total no of } ops}{opsDevice} \quad \text{Equation 8}$$

The example computation cycles determiner 212 may provide the computation cycles value to the example comparator 208. Alternatively, the example computation cycles determiner 212 stores the computation cycles value of the layer in the batching database 210 with a corresponding layer identifier.

In some examples, the computation cycles determiner 212 includes a counter that may count the number of input batches for which computation cycles are determined. For example, the computation cycles determiner 212 may obtain or receive one or more input batches from the batching database 210 that are configured to be analyzed by the model 102. In such an example, the total number of operations of the layer may be a factor of the activation tensors and an input batch size. In this manner, the example computation cycles determiner 212 determines computation cycles per batch per layer. In some examples, the counter increments a number value when the computation cycles determiner 212 determines there is another batch in the batching database 210 that has not been analyzed (e.g., for which computation cycles have not been determined). The example computation cycles determiner 212 determines the computation cycles until all the batches (e.g., the maximum number of batches) have been accounted for.

In the illustrated example of FIG. 2, the example dynamic batching controller 110 includes the example memory cycles determiner 214 to determine the memory cycles configured to occur for the layer. In some examples, the memory cycles determiner 214 obtains the weights of the layer from the example batching database 210. For example, the memory cycles determiner 214 queries the batching database 210 for a weight value, determined by the layer operations controller 204, corresponding to the layer. In some examples, the memory cycles determiner 214 obtains the CE configurations 124 from the example engine characteristics controller 206 and/or the example batching database 210.

The example memory cycles determiner 214 determines the memory cycles configured to occur for the layer utilizing the information obtained from the example batching database 210. For example, the memory cycles determiner 214 determines the memory cycles configured to occur for the layer utilizing Equation 9 below. In Equation 9, the ddr- Cycles represents the number of double data rate cycles, or in other words, the memory cycles, configured to occur for the layer, the deviceFreq represents the clock speed at which the example accelerator 120 executes tasks in hertz (MHz), and the ddrBW represents the double data rate bandwidth size of the example memory 118 in giga bytes per second (GB/s). In some examples, the memory cycles determiner 214 may utilize Equation 9 for every selected layer.

$$ddrCycles = weights \times \frac{deviceFreq \times 10^6}{ddrBW \times 10^9} \qquad \text{Equation 9}$$

The example memory cycles determiner 214 may provide the memory cycles value to the example comparator 208. Alternatively, the example memory cycles determiner 214 stores the memory cycles value of the layer in the batching database 210 with a corresponding layer identifier.

In some examples, comparator 208 compares the computation cycles to the memory cycles of the layer to determine a performance of the layer. For example, the comparator 208 determines which of the two cycles (e.g., memory cycles or computation cycles) are greater than the other. In some examples, when the comparator 208 determines the memory cycles are greater than the computation cycles, the example comparator notifies the example batch size determination controller 216. In some examples, when the comparator 208 determines the computation cycles are greater than the memory cycles, the comparator 208 notifies the batch size determination controller 216. The example comparator 208 stores the performance in the example batching database 210. For example, the comparator 208 stores the performance in the batching database 210 with a batch n identifier and/or a layer identifier.

In the illustrated example of FIG. 2, the example dynamic batching controller 110 includes the example batch size determination controller 216 to determine a dynamic batch size for the layers based on the computation cycles and memory cycles of the layer when an input batch is input to the layer. In some examples, the batch size determination controller 216 begins by obtaining the maximum batch size for the model 102. For example, the batch size determination controller 216 obtains the maximum batch size value from the batching database 210 or from the computation cycles determiner 212.

Further, the example batch size determination controller 216 measures the collective performance of the layer when different batch sizes are obtained by the layer. For example, the batch size determination controller 216 utilizes the performances, determined by the comparator 208, to combine input batches to generate a batch size m for measuring the collective performance of one or more input batches. For example, the collective performance measurement helps the batch size determination controller 216 to determine a batch size m for the layer that enables the memory cycles to be equal to or less than the computation cycles. For example, the model 102 includes five layers and there is a total of four images (e.g., four input batches) to be obtained by the model 102. In some examples, the batch size determination controller 216 analyzes the performance (e.g., compute vs memory cycles) of layer one first. For example, the batch size determination controller 216 analyzes the computation cycles versus memory cycles when four batches are obtained in parallel, when three batches are obtained in parallel, when two batches are obtained in parallel, and when one batch is obtained. The batch size m having a collective performance measurement indicative of memory cycles less than computation cycles will be selected as the dynamic batch size for the layer. In some examples, if a batch size does not have a collective performance measurement indicative of memory cycles less than computation cycles, then the batch size determination controller 216 selects the batch size having a performance measurement indicative of memory cycles equal to computation cycles.

The example batch size determination controller 216 continues to analyze the layers using different batch sizes until there are no more layers to analyze. In some examples, the batch size determination controller 216 stores the dynamic batch size m in the batching database 210 with a corresponding layer identifier.

The example batch size determination controller 216 generates the batch schedule 122 utilizing the batch sizes. For example, the batch size determination controller 216 generates instructions indicative of a batch queue, where batches are instructed to be queued up (e.g., stored into the cache 116) based on the batch size of the layer. For example, layer one is executed first, so the batch queue for layer one is equal to the batch size determined for layer one. Then layer two is executed after the batches have been processed (e.g., obtained and computed) by layer one. The batch queue is then equal to the batch size (e.g., the dynamic batch size) corresponding to layer two. The process continues until the dynamic batch schedule 122 is completed. In some examples, a batch schedule is complete when the neural compute engine 108 has obtained the batches and has executed the batches with the layers of the model 102.

While an example manner of implementing the system 100 of FIG. 1 is illustrated in FIG. 2, one or more of the elements, processes and/or devices illustrated in FIG. 2 may be combined, divided, re-arranged, omitted, eliminated and/or implemented in any other way. Further, the example pre-compilation processor 104, the example compiler 106, the example computation controller 112, the example memory controller 114, the example accelerator 120, the example topology extractor 202, the example layer operations controller 204, the example engine characteristics controller 206, the example comparator 208, the example batching database 210, the example computation cycles determiner 212, the example memory cycles determiner 214, the example batch size determination controller 216, and/or, more generally, the example dynamic batching controller 110 of FIG. 1 may be implemented by hardware, software, firmware and/or any combination of hardware, software and/or firmware. Thus, for example, any of the example pre-compilation processor 104, the example compiler 106, the example dynamic batching controller 110, the example computation controller 112, the example memory controller 114, the example accelerator 120, the example topology extractor 202, the example layer operations controller 204, the example engine characteristics controller 206, the example comparator 208, the example batching database 210, the example computation cycles determiner 212, the example memory cycles determiner 214, the example batch size determination controller 216 and/or, more generally, the example system 100 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example pre-compilation processor 104, the example compiler 106, the example dynamic batching controller 110, the example computation controller 112, the example memory controller 114, the example accelerator 120, the example topology extractor 202, the example layer operations controller 204, the example engine characteristics controller 206, the example comparator 208, the example batching database 210, the example computation cycles determiner 212, the example memory cycles determiner 214, and/or the example batch size determination controller 216 is/are hereby expressly defined to include a non-transitory computer readable storage device or storage disk such as a memory, a digital versatile disk (DVD), a compact disk (CD), a Blu-ray disk, etc. including the software and/or firmware. Further still, the example system 100 of FIG. 1 may include one or more elements, processes and/or devices in addition to, or instead of, those illustrated in FIG. 2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 3:
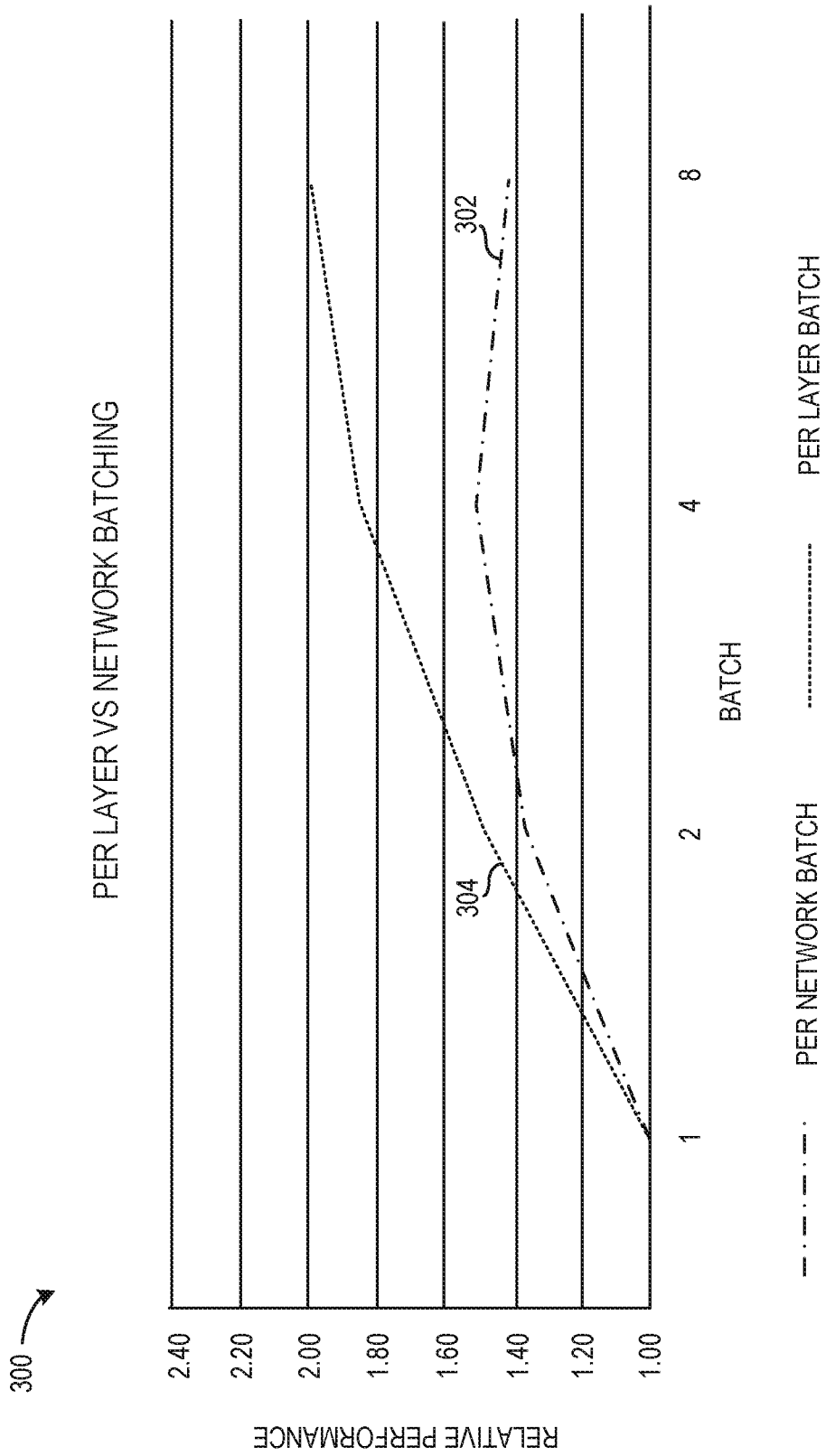
FIG. 3 is a graph depicting example relative performance curves of per-layer dynamic batching and per-network dynamic batching of the example neural compute engine of FIG. 1.

FIG. 3 is a graph 300 illustrating results of an example performance of the example neural compute engine 108 (FIG. 1) when executing the example model 102 (FIG. 1). In FIG. 3, the example graph includes a first performance line 302 and a second performance line 304. The example first performance line 302 corresponds to the performance of the example neural compute engine 108 when a static batch size is determined for the model 102. For example, the compiler 106 of the example system 100 of FIG. 1 may have directly obtained the model 102 and determined a static batch size for the layers in the model 102. In this manner, the example neural compute engine 108 is instructed to process the layers with the static batch size, regardless of the layer parameters and compute engine characteristics.

In the example graph 300, the relative performance of the per network batch decreases when the batch size increases. For example, the relative performance is indicative of a number of images or input data computed per second at each batch size, where the number of input data computed has been normalized by the number of input data per second for batch size 1. For example, the number of computation cycles versus memory cycles performed for a batch size greater than 1 is divided by the number of computation cycles versus memory cycles performed for a batch size equal to 1. In some examples, the relative performance decrease occurs when the data size (e.g., amount of input data) does not fit in the memory cache (e.g., cache 116), thus causing memory cycles to increase in order to transfer data, that does not fit in the memory cache, from the memory to the memory cache.

In the example graph 300, the second performance line 304 corresponds to the performance of the example neural compute engine 108 when a dynamic batch size is determined for the layers in the topology. For example, the second performance line 304 corresponds to the performance of the neural compute engine 108 when the pre-compilation processor 104 performs dynamic batch selection of the layers in the model 102. In the graph 300, the relative performance of the per layer batch increases throughout the input of different batch sizes. In such an example, the batch size of eight may be the maximum batch size of the model 102. The example pre-compilation processor 104 determines that a layer (e.g., a first layer, a second layer, one or more layers, etc.) of the example model 102 can receive eight input batches while maintaining power consumption efficiency and keeping latency low.

Figure 4:
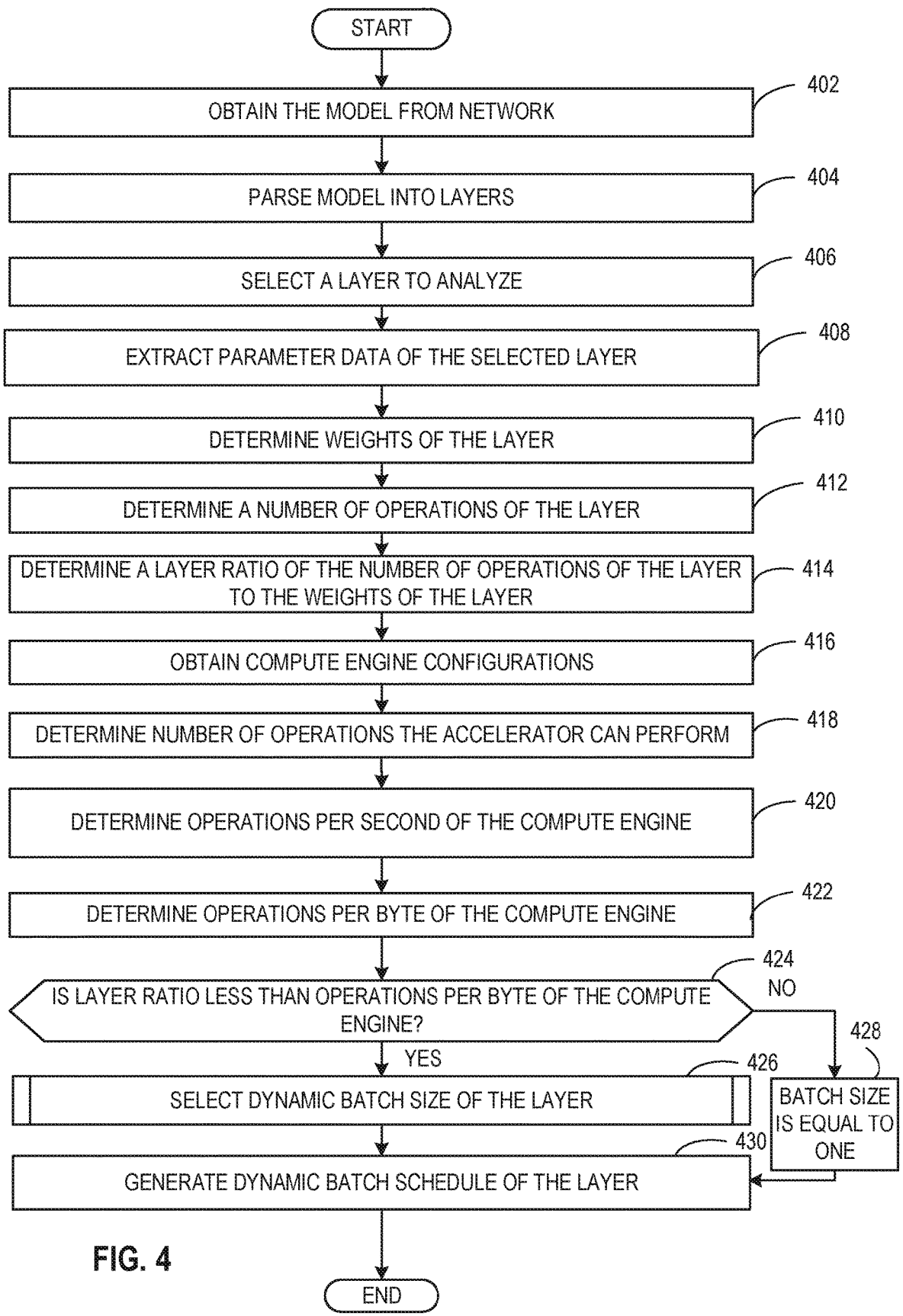
FIG. 4 is a flowchart representative of machine-readable instructions which may be executed to implement the example dynamic batching controller of FIGS. 1 and 2 to determine a dynamic batch schedule.
Figure 5:
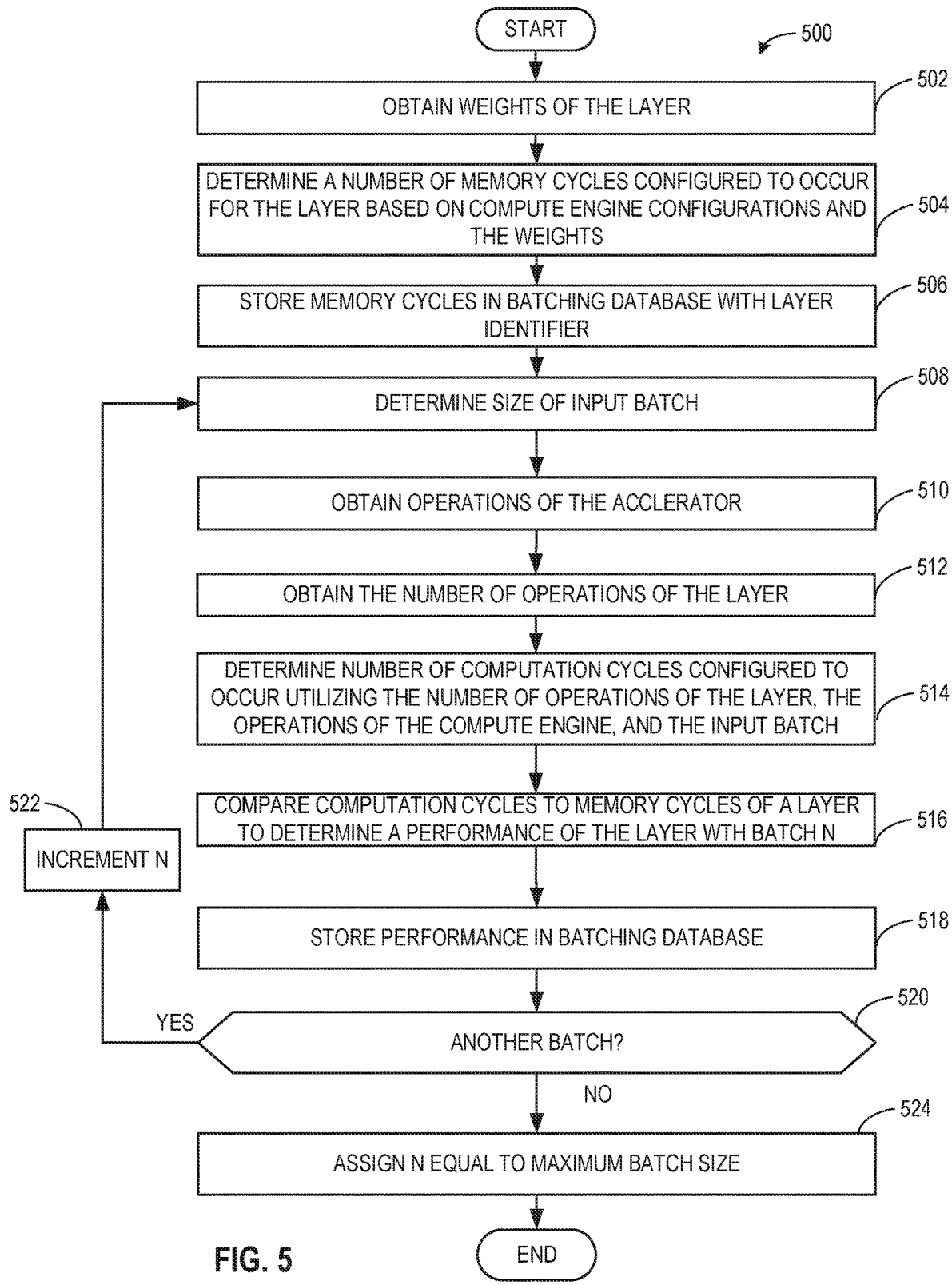
FIG. 5 is a flowchart representative of machine-readable instructions which may be executed to implement the example dynamic batching controller of FIGS. 1 and 2 to determine a performance measurement and a maximum batch size.
Figure 6:
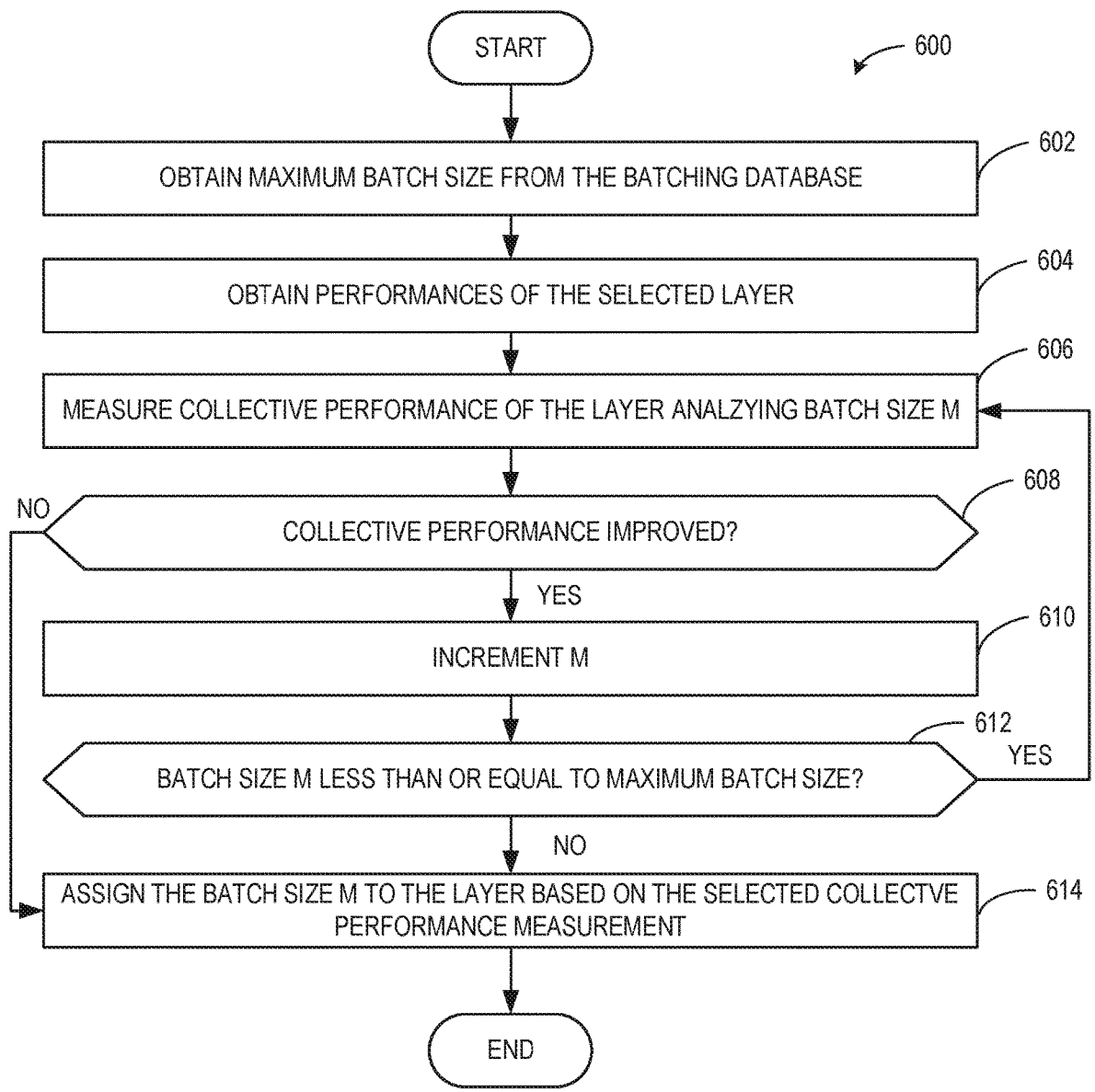
FIG. 6 is a flowchart representative of machine-readable instructions which may be executed to implement the example dynamic batching controller of FIGS. 1 and 2 to determine a dynamic batch size.

Flowcharts representative of example hardware logic, machine readable instructions, hardware implemented state machines, and/or any combination thereof for implementing the example model 102, the example pre-compilation processor 104, the example compiler 106, and the example dynamic batching controller 110 of FIG. 1 are shown in FIGS. 4-6. The machine-readable instructions may be one or more executable programs or portion(s) of the one or more executable programs for execution by a computer processor such as the processor 712 shown in the example processor platform 700 discussed below in connection with FIG. 7. The program(s) may be embodied in software stored on a non-transitory computer readable storage medium such as a CD-ROM, a floppy disk, a hard drive, a DVD, a Blu-ray disk, or a memory associated with the processor 712, but the entirety of the program(s) and/or parts thereof could alternatively be executed by a device other than the processor 712 and/or embodied in firmware or dedicated hardware. Further, although the example program(s) is/are described with reference to the flowcharts illustrated in FIGS. 4-6, many other methods of implementing the example model 102, the example pre-compilation processor 104, the example compiler 106, and the example dynamic batching controller 110 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine-readable instructions described herein may be stored in one or more of a compressed format, an encrypted format, a fragmented format, a compiled format, an executable format, a packaged format, etc. Machine-readable instructions as described herein may be stored as data (e.g., portions of instructions, code, representations of code, etc.) that may be utilized to create, manufacture, and/or produce machine executable instructions. For example, the machine-readable instructions may be fragmented and stored on one or more storage devices and/or computing devices (e.g., servers). The machine-readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine-readable instructions may be stored in multiple parts, which are individually compressed, encrypted, and stored on separate computing devices, wherein the parts when decrypted, decompressed, and combined form a set of executable instructions that implement a program such as that described herein.

In another example, the machine-readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine-readable instructions may need to be configured (e.g., settings stored, data input, network addresses recorded, etc.) before the machine-readable instructions and/or the corresponding program(s) can be executed in whole or in part. Thus, the disclosed machine-readable instructions and/or corresponding program(s) are intended to encompass such machine readable instructions and/or program(s) regardless of the particular format or state of the machine-readable instructions and/or program(s) when stored or otherwise at rest or in transit.

The machine-readable instructions described herein can be represented by any past, present, or future instruction language, scripting language, programming language, etc. For example, the machine-readable instructions may be represented using any of the following languages: C, C++, Java, C #, Perl, Python, JavaScript, HyperText Markup Language (HTML), Structured Query Language (SQL), Swift, etc.

As mentioned above, the example processes of FIGS. 4-6 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

The program of FIG. 4 includes block 402 at which the example topology extractor 202 (FIG. 2) obtains the model 102 (FIG. 1) from a network. For example, the topology extractor 202 may be communicatively coupled to a database center, a cloud server, an edge server, etc., that provides the model 102 to the example pre-compilation processor 104 (FIG. 1), and the topology extractor 202 obtains the model 102 from the pre-compilation processor 104.

The example topology extractor 202 parses the model 102 into layers (block 404). For example, the topology extractor 202 parses the model 102 into layers including nodes and edges utilizing a parser, such as a compiler or interpreter. The example topology extractor 202 selects a layer to analyze (block 406). The topology extractor 202 extracts parameter data from the selected layer (block 408). For example, the topology extractor 202 extracts tensor sizes and weight sizes of the selected layer from the metadata of the layer parsed from the model 102.

The example layer operations controller 204 determines weights of the layer (block 410). For example, the layer operations controller 204 (FIG. 2) obtains the parameter data from the example topology extractor 202 and/or the example batching database 210 (FIG. 2), and uses the parameter data (e.g., tensors, weights, etc.) to determine the weight size, in bytes, of the layer utilizing Equation 1 above.

The example layer operations controller 204 determines a number of operations of the layer (block 412). For example, the layer operations controller 204 determines the total number of operations of a layer utilizing the parameter data. The example layer operations controller 204 may determine the number of operations of a layer utilizing Equation 2 above. The layer operations controller 204 determines a layer ratio of the number of operations of the layer to the weights of the layer (block 414). For example, the layer operations controller 204 compares the operation size of the layer to the weight size and thereby determines the condition for dynamic batching is matched (e.g., the layer operations controller 204 determines a value indicative of a match for a dynamic batching condition, where the value is the quotient of the layer ratio). For example, the determining of the layer ratio is to facilitate confirming at block 424 if a dynamic batch size can be selected. In some examples, the layer operations controller 204 stores the weight size, the number of operations of the layer, and the layer ratio in the batching database 210.

The example engine characteristics controller 206 (FIG. 2) obtains the compute engine configurations 124 (FIG. 1) (block 416) from the example pre-compilation memory 128 (FIG. 1). For example, the pre-compilation memory 128 obtains, from the neural compute engine 108, a metadata file or an abstraction of the resources of the neural compute engine 108 and provides the information (e.g., metadata file, abstraction, etc.) to the engine characteristics controller 206 upon request.

The example engine characteristics controller 206 determines a number of operations the accelerator 120 (FIG. 1) can perform (block 418). For example, the engine characteristics controller 206 determines the number of operations the example accelerator 120 can perform utilizing Equation 4 above.

The example engine characteristics controller 206 determines the operations per second of the neural compute engine 108 based on the compute engine configurations (block 420).

The example engine characteristics controller 206 determines operations per byte of the neural compute engine 108 (block 420). For example, the engine characteristics controller 206 determines the operations per second of the neural compute engine 108 based on the CE configurations 124 (FIGS. 1 and 2) utilizing Equation 5 above. The example engine characteristics controller 206 determines operations per byte of the neural compute engine 108 (block 422). For example, the engine characteristics controller 206 utilizes the number of operations the accelerator 120 can perform and the operations per second of the example neural compute engine 108 to determine the operations per byte of the neural compute engine 108. In this manner, the example engine characteristics controller 206 determines the operations delivered for each byte of parameters configured to be transferred from memory 118 (FIG. 1) to the example accelerator 120. The example engine characteristics controller 206 can determine the operations per byte of the neural compute engine 108 utilizing Equation 6 above.

The example comparator 208 (FIG. 2) determines if the layer ratio is less than the operations per byte of the neural compute engine 108 (block 424). For example, the comparator 208 obtains the operations per byte of the neural compute engine 108 from the engine characteristics controller 206 or from the batching database 210, and determines a batching condition for the selected layer utilizing Equation 7 above.

When the example comparator 208 determines at block 424 that the batching condition is true (e.g., block 424 returns a value of YES), the comparator 208 notifies the example computation cycles determiner 212 (FIG. 2) and the example memory cycles determiner 214 (FIG. 2) to select a dynamic batch size for the layer (block 426). Example instructions that may be executed to implement block 426 are represented in the flowcharts of FIGS. 5 and 6 which are described below. In other examples, when the batching condition is not true (e.g., block 424 returns a value of NO), the comparator 208 notifies the example batch size determination controller 216 (FIG. 2) that the batch size of the layer is equal to one (block 428).

The example batch size determination controller 216 (FIG. 2) generates a dynamic batch schedule 122 (FIG. 1) of the layer (block 430). The example batch size determination controller 216 generates the batch schedule 122 utilizing the dynamic batch size selected at block 426. For example, the batch size determination controller 216 generates instructions indicative of a batch queue, where the neural compute engine 108 queues up batches (e.g., stored into the cache 116) based on the batch size of the layer.

In some examples, the instructions represented by the flowchart of FIG. 4 are executed multiple times in an iterative manner so that the batch size determination controller 216 can generate multiple portions of the batch schedule 122 until all batch sizes have been determined for the layers in the model 102. The program of FIG. 4 ends when the batch schedule 122 has been generated but may be repeated when a new layer is selected to analyze.

FIGS. 5 and 6 represent example machine readable instructions that may be used to implement block 426 of FIG. 4. For example, instructions 500 represented in FIG. 5 may be executed to measure a performance of the layer to select a maximum batch size, and instructions 600 represented in FIG. 6 may be executed to select a dynamic batch size based on the maximum batch size determined at FIG. 5.

The program of FIG. 5 begins when the example memory cycles determiner 214 (FIG. 2) obtains weights of the layer (block 502). For example, the memory cycles determiner 214 queries the batching database 210 (FIG. 2) for the weights corresponding to the layer selected by the topology extractor 202 (FIG. 2) at block 406 of FIG. 4.

The example memory cycles determiner 214 determines a number of memory cycles configured to occur for the layer based on the compute engine configurations 124 and the weights (block 504). For example, the memory cycles determiner 214 determines the memory cycles configured to occur for the layer utilizing Equation 9 above. The example memory cycles determiner 214 may provide the number of memory cycles to the example comparator 208. Alternatively, the example memory cycles determiner 214 stores the number of memory cycles of the layer in the batching database 210 with a layer identifier (block 506).

In some examples, the memory cycles determiner 214 determines the number of memory cycles of the layer once, and the layer utilizes the same set of weights for multiple input batches. In other examples, the memory cycles determiner 214 determines the number of memory cycles of the layer multiple times to use different numbers of memory cycles for different ones of the input batches.

The example computation cycles determiner 212 determines the size of the input batch (block 508). For example, prior to determining the size of the input batch, the topology extractor 202 (FIG. 2) obtains the input batches of the model 102 and stores them in the batching database 210 (FIG. 2), and the computation cycles determiner 212 (FIG. 2) obtains an input batch n from the input batches stored in the batching database 210. The example computation cycles determiner 212 then determines the size (e.g., bit, byte, etc.) of the input (e.g., image, text, etc.) of the input batch n.

The example computation cycles determiner 212 obtains the operations of the example accelerator 120 (FIG. 1) from the batching database 210 (block 510). Additionally, the example computation cycles determiner 212 obtains the number of operations of the layer (block 512) from the batching database 210. For example, the computation cycles determiner 212 queries the batching database 210 for information corresponding to the neural compute engine 108 (e.g., the opsDevice of the accelerator 120) and information corresponding to the layer (e.g., total number of operations of the layer).

The example computation cycles determiner 212 determines the number of computation cycles configured to occur utilizing the number of operations of the layer, the operations of the compute engine, and the input batch (block 514). For example, the computation cycles determiner 212 determines the number of computation cycles configured to occur utilizing Equation 8 above. In some examples, the computation cycles determiner 212 stores the computation cycles in the batching database 210 or provides the computation cycles to the comparator 208.

The example comparator 208 (FIG. 2) compares the computation cycles to memory cycles of the layer to determine a performance value of the layer with batch n (block 516). For example, the comparator 208 obtains the memory cycles of the layer and determines if the memory cycles are less than, greater than, or equal to the computation cycles determined for the batch n of the selected layer. In some examples, the performance value is a ratio, a decimal, a fraction, a number, etc. In some examples, when the performance value is greater than one, then the performance value is indicative that there are more compute cycles than memory cycles (e.g., compCycles/ddrCycles=2). In some examples, when the performance value is less than one, the performance value is indicative that there are more memory cycles than compute cycles (e.g., compCycles/ddrCycles=0.5).

The example comparator 208 stores the performance in the example batching database 210 (block 518). For example, the comparator 208 stores the performance value in the batching database 210 with a batch n identifier and/or a layer identifier.

The example computation cycles determiner 212 determines if there is another batch (block 520). For example, the computation cycles determiner 212 may obtain or receive one or more input batches from the batching database 210 that are configured to be analyzed by the model 102. In some examples, when the computation cycles determiner 212 determines there is another batch (e.g., block 520 returns a value of YES), the computation cycles determiner 212 increments batch counter n (block 522). For example, the computation cycles determiner 212 includes the batch counter n to count the number of input batches for which computation cycles are determined. In some examples, the batch counter n may increment a number value when the computation cycles determiner 212 determines there is another batch. Control returns to block 508 when the computation cycles determiner 212 increments batch counter n.

In some examples, when the computation cycles determiner 212 determines there is not another batch (e.g., block 520 returns a value of NO), the computation cycles determiner 212 assigns the value of the batch counter n to a maximum batch size variable (block 524). For example, the maximum batch size of the model 102 may be equal to the number of input batches for which the model 102 is to analyze. For example, when 10 input images are to be analyzed by the model 102, the maximum batch size is equal to 10.

The program of FIG. 5 ends when the maximum batch size variable has been assigned a value. The program of FIG. 5 may be repeated when a set of weights are obtained by the example memory cycles determiner 214.

Turning now to FIG. 6, the machine-readable instructions 600 may be used to implement block 426 of FIG. 4 by selecting a dynamic batch size for a layer based on the maximum batch size determined at FIG. 5. In examples disclosed herein, the machine-readable instructions 600 are used in connection with and/or subsequent to machine readable instructions 500. For example, the machine-readable instructions 600 may be initiated when the computation cycles determiner (FIG. 2) determines the maximum batch size of the model 102 at block 524 of FIG. 5. In this manner, the program of FIG. 6 begins when the example batch size determination controller 216 (FIG. 2) obtains the maximum batch size from the batching database 210 (FIG. 2) (block 602). In some examples, the maximum batch size is the maximum batch size for the model 102, and therefore, for the layers in the model.

The example batch size determination controller 216 obtains the performances of the selected layer (e.g., the selected layer from block 406 of FIG. 4) (block 604). For example, the batch size determination controller 216 queries the batching database 210 for performance values corresponding to the layer. In some examples, the performance values correspond to the computation cycles and memory cycles of the layer and the input batch n.

The example batch size determination controller 216 measures the collective performance of the layer analyzing batch size m (block 606). For example, batch size m corresponds to a number of input batches. The example batch size determination controller 216 measures the collective performance of the layer when the layer receives one input batch, when the layer receives two input batches in parallel, when the layer receives m input batches in parallel. In some examples, the collective performance corresponds to the performance of layer with the input batch. For example, a performance of layer 1 batch 1 is equal to a value of 0.5 (e.g., there are 50 computation cycles and 100 memory cycles). The example batch size determination controller 216 measures the collective performance of two input batches (e.g., batch 1 and batch 2 of layer 1), where two input batches are measured to have a collective performance equal to a value of 1 (e.g., batch 1=50 computation cycles, batch 2=50 computation cycles, therefore total computation cycles=100).

The example batch size determination controller 216 determines if the collective performance improved (block 608). For example, the batch size determination controller 216 determines if batch size m resulted in a higher number of computation cycles than previous batch size m. In some examples, the batch size determination controller 216 determines if batch size m resulted in more computation cycles than memory cycles. If the batch size determination controller 216 determines the collective performance did not improve (e.g., block 608 returns a value of NO), the batch size determination controller 216 assigns the batch size m to the layer based on the collective performance measurement (block 614). For example, when the collective performance measurement does not improve with a batch size m, then incrementing the batch size may decrease or not improve the collective performance because the increased number of computation cycles may not fit in the example cache 116 and therefore will need to be transferred to and from the memory 118, thus increasing the number of memory cycles.

If the batch size determination controller 216 determines the collective performance improved (e.g., block 608 returns a value of YES), the batch size determination controller 216 increments the batch size m (block 610). For example, the batch size determination controller 216 increases the batch size to determine if the layer can take on a larger number of input batches.

The example batch size determination controller 216 determines if the batch size m is less than or equal to the maximum batch size (block 612). For example, the layer can only obtain and/or analyze the number of input batches given. Therefore, if the example batch size determination controller 216 determines the batch size m is less than or equal to the maximum batch size (e.g., block 612 returns a value YES), then control returns to block 606 and the batch size determination controller 216 measures the collective performance of the layer based on the layer analyzing an input of batch size m.

However, if the batch size determination controller 216 determines the batch size m is not less than or equal to the maximum batch size, the batch size determination controller 216 assigns the batch size m to the layer based on the collective performance measurement (block 614). For example, the batch size m will be the dynamic batch size for the layer.

The program of FIG. 6 ends when the batch size m is assigned to the layer. The program of FIG. 6 may be repeated when the example batch size determination controller 216 obtains a new set of performances of a layer.

Figure 7:
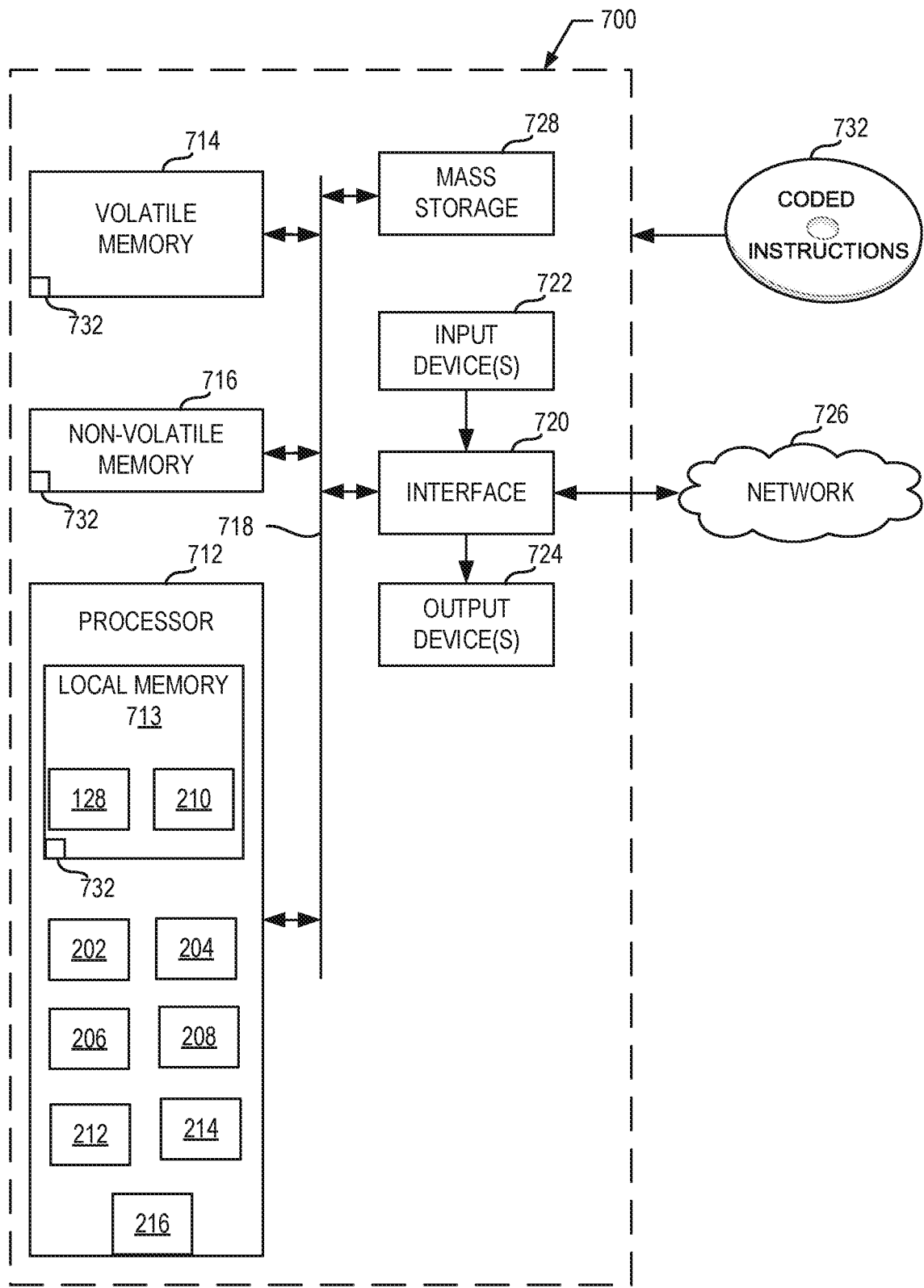
FIG. 7 is a block diagram of an example processing platform structured to execute the instructions of FIGS. 4, 5, and 6 to implement the example dynamic batching controller of FIGS. 1 and 2.

FIG. 7 is a block diagram of an example processor platform 1000 structured to execute the instructions of FIGS. 4-6 to implement the dynamic batching controller 110 of FIGS. 1 and 2. The processor platform 700 can be, for example, a server, a personal computer, a workstation, a self-learning machine (e.g., a neural network), a mobile device (e.g., a cell phone, a smart phone, a tablet such as an iPad'), a personal digital assistant (PDA), an Internet appliance, a DVD player, a gaming console, a personal video recorder, a set top box, a wearable device, or any other type of computing device.

The processor platform 700 of the illustrated example includes a processor 712. The processor 712 of the illustrated example is hardware. For example, the processor 712 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example topology extractor 202, the example layer operations controller 204, the example engine characteristics controller 206, the example comparator 208, the example computation cycles determiner 212, the example memory cycles determiner 214, and the example batch size determination controller 216.

The processor 712 of the illustrated example includes a local memory 713 (e.g., a cache). The local memory 713 may implement the example pre-compilation memory 128 and the example batching database 210. The processor 712 of the illustrated example is in communication with a main memory including a volatile memory 714 and a non-volatile memory 716 via a bus 718. The volatile memory 714 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 716 may be implemented by flash memory and/or any other desired type of memory device. Access to the main memory 714, 716 is controlled by a memory controller.

The processor platform 700 of the illustrated example also includes an interface circuit 720. The interface circuit 720 may be implemented by any type of interface standard, such as an Ethernet interface, a universal serial bus (USB), a Bluetooth® interface, a near field communication (NFC) interface, and/or a PCI express interface.

In the illustrated example, one or more input devices 722 are connected to the interface circuit 720. The input device(s) 722 permit(s) a user to enter data and/or commands into the processor 712. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 724 are also connected to the interface circuit 720 of the illustrated example. The output devices 724 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 720 of the illustrated example, thus, typically includes a graphics driver card, a graphics driver chip and/or a graphics driver processor.

The interface circuit 720 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 726. The communication can be via, for example, an Ethernet connection, a digital subscriber line (DSL) connection, a telephone line connection, a coaxial cable system, a satellite system, a line-of-site wireless system, a cellular telephone system, etc.

The processor platform 700 of the illustrated example also includes one or more mass storage devices 728 for storing software and/or data. Examples of such mass storage devices 728 include floppy disk drives, hard drive disks, compact disk drives, Blu-ray disk drives, redundant array of independent disks (RAID) systems, and digital versatile disk (DVD) drives.

Example machine executable instructions 732 represented in FIGS. 4-6 may be stored in the mass storage device 728, in the volatile memory 714, in the non-volatile memory 716, and/or on a removable non-transitory computer readable storage medium such as a CD or DVD.

Example methods, apparatus, systems, and articles of manufacture to determine a dynamic batch size of a layer are disclosed herein. Further examples and combinations thereof include the following: Example 1 includes an apparatus to determine a dynamic batch size of a layer, the apparatus comprising a layer operations controller to determine a layer ratio between a number of operations of a layer and weights of the layer, a comparator to compare the layer ratio to a number of operations per unit of memory size performed by a computation engine, and a batch size determination controller to, when the layer ratio is less than the number of operations per unit of memory size, determine the dynamic batch size of the layer.

Example 2 includes the apparatus of example 1, further including an engine characteristics controller to determine a number of operations that an accelerator can perform, determine operations per second of the compute engine utilizing the number of operations that an accelerator can perform, and determine the number of operations per unit of memory size performed by the compute engine by comparing the operations per second of the compute engine to a bandwidth of the compute engine.

Example 3 includes the apparatus of example 1, further including a topology extractor to intercept a model from a compiler, the model including the layer.

Example 4 includes the apparatus of example 3, wherein the topology extractor is to extract parameter data from the layer of the model, the parameter data including the weights of the layer and activation tensors of the layer.

Example 5 includes the apparatus of example 1, wherein the layer operations controller is to determine the number of operations of the layer by combining a plurality of bit sizes corresponding to activation tensors.

Example 6 includes the apparatus of example 1, wherein the batch size determination controller is to determine the dynamic batch size of the layer is one when the layer ratio is greater than the number of operations per unit of memory size.

Example 7 includes the apparatus of example 1, wherein the batch size determination controller is to generate a dynamic batch schedule of the layer, the dynamic batch schedule corresponding to the dynamic batch size of the layer.

Example 8 includes a non-transitory computer readable storage medium comprising instructions that, when executed, cause a machine to at least determine a layer ratio between a number of operations of a layer and weights of the layer, compare the layer ratio to a number of operations per unit of memory size performed by a computation engine, and when the layer ratio is less than the number of operations per unit of memory size, determine a dynamic batch size of the layer.

Example 9 includes the non-transitory computer readable storage medium of example 8, wherein the instructions, when executed, cause the machine to determine a number of operations that an accelerator can perform, determine operations per second of the compute engine utilizing the number of operations that an accelerator can perform, and determine the number of operations per unit of memory size performed by the compute engine by comparing the operations per second of the compute engine to a bandwidth of the compute engine.

Example 10 includes the non-transitory computer readable storage medium of example 8, wherein the instructions, when executed, cause the machine to intercept a model from a compiler, the model including the layer.

Example 11 includes the non-transitory computer readable storage medium of example 10, wherein the instructions, when executed, cause the machine to extract parameter data from the layer of the model, the parameter data including the weights of the layer and activation tensors of the layer.

Example 12 includes the non-transitory computer readable storage medium of example 8, wherein the instructions, when executed, cause the machine to determine the number of operations of the layer by combining a plurality of bit sizes corresponding to activation tensors.

Example 13 includes the non-transitory computer readable storage medium of example 8, wherein the instructions, when executed, cause the machine to determine the dynamic batch size of the layer is one when the layer ratio is greater than the number of operations per unit of memory size.

Example 14 includes the non-transitory computer readable storage medium of example 8, wherein the instructions, when executed, cause the machine to generate a dynamic batch schedule of the layer, the dynamic batch schedule corresponding to the dynamic batch size of the layer.

Example 15 includes a method comprising determining a layer ratio between a number of operations of a layer and weights of the layer, comparing the layer ratio to a number of operations per unit of memory size performed by a computation engine, and when the layer ratio is less than the number of operations per unit of memory size, determining a dynamic batch size of the layer.

Example 16 includes the method of example 15, further including determining a number of operations that an accelerator can perform, determining operations per second of the compute engine utilizing the number of operations that an accelerator can perform, and determining the number of operations per unit of memory size performed by the compute engine by comparing the operations per second of the compute engine to a bandwidth of the compute engine.

Example 17 includes the method of example 15, further including intercepting a model from a compiler, the model including the layer.

Example 18 includes the method of example 17, further including extracting parameter data from the layer of the model, the parameter data including the weights of the layer and activation tensors of the layer.

Example 19 includes the method of example 15, further including determining the number of operations of the layer by combining a plurality of bit sizes corresponding to activation tensors.

Example 20 includes the method of example 15, further including generating a dynamic batch schedule of the layer, the dynamic batch schedule corresponding to the dynamic batch size of the layer.

Example 21 includes an apparatus comprising means for determining a layer ratio between a number of operations of a layer and weights of the layer, means for comparing the layer ratio to a number of operations per unit of memory size performed by a computation engine, and means for determining a dynamic batch size of the layer when the layer ratio is less than the number of operations per unit of memory size.

Example 22 includes the apparatus of example 21, further including means for controlling to determine a number of operations that an accelerator can perform, determine operations per second of the compute engine utilizing the number of operations that an accelerator can perform, and determine the number of operations per unit of memory size performed by the compute engine.

Example 23 includes the apparatus of example 21, further including means for extracting parameter data from the layer of a model, the parameter data including the weights of the layer and activation tensors of the layer.

Example 24 includes the apparatus of example 21, wherein the means for determining is to determine the number of operations of the layer by combining a plurality of bit sizes corresponding to activation tensors.

Example 25 includes the apparatus of example 21, wherein the means for determining is to determine the dynamic batch size of the layer is one when the layer ratio is greater than the number of operations per unit of memory size.

From the foregoing, it will be appreciated that example methods, apparatus and articles of manufacture have been disclosed that select dynamic batch sizes per layer in a model by pre-processing the model to analyze layer operations and compare the layer operations with compute engine configurations. The disclosed methods, apparatus and articles of manufacture improve the efficiency of a computing device by ensuring an equal ratio between computation cycles and memory cycles of a layer to reduce the latency and power consumption of the compute engine. The disclosed methods, apparatus and articles of manufacture are accordingly directed to one or more improvement(s) in the functioning of a computer.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
   interface circuitry;
   machine-readable instructions; and
   at least one processor circuit to be programmed by the machine-readable instructions to;
   determine a first layer ratio between a first number of computation operations for a first layer of a model and a first number of weights of the first layer;

determine a second layer ratio between a second number of computation operations for a second layer of the model and a second number of weights of the second layer, the second layer ratio different from the first layer ratio;

compare the first layer ratio to a number of operations performed by a compute engine per unit of data;

compare the second layer ratio to the number of operations performed by the compute engine per the unit of data;

based on the comparisons, select a first dynamic batch size of the first layer of the model to be different than a second dynamic batch size of the second layer of the model after a determination that the first dynamic batch size provides better cache usage in a hardware circuit than a reference batch size of the model;

parallel batch process first inputs of the first layer of the model based on the first dynamic batch size; and parallel batch process second inputs of the second layer of the model based on the second dynamic batch size.

2. The apparatus of claim 1, wherein one or more of the at least one processor circuit is to:

determine a number of operations that an accelerator can perform; and determine the operations per second of the compute engine based on the number of operations that the accelerator can perform.

3. The apparatus of claim 1, wherein the model is a neural network model, the one or more of the at least one processor circuit to intercept the neural network model before a compiler compiles the neural network model, the neural network model including the first layer and the second layer.

4. The apparatus of claim 3, wherein the one or more of the at least one processor circuit is to extract parameter data from the first layer, the parameter data including the weights of the first layer and activation tensors of the first layer.

5. The apparatus of claim 1, wherein the one or more of the at least one processor circuit is to determine the first number of computation operations of the first layer by combining a plurality of bit sizes corresponding to activation tensors.

6. The apparatus of claim 1, wherein the one or more of the at least one processor circuit is to determine the second dynamic batch size of the second layer is equal to one after a determination that the second layer ratio is greater than the number of operations performed by the compute engine per the unit of data.

7. The apparatus of claim 1, wherein the one or more of the at least one processor circuit is to generate a dynamic batch schedule, the dynamic batch schedule including batch sizes for ones of a plurality of layers in the model, the dynamic batch schedule using the first dynamic batch size of the first layer.

8. At least one non-transitory machine-readable medium comprising machine-readable instructions to cause at least one processor circuit to at least:

determine a first layer ratio between a first number of computation operations for a first layer of a model and a first number of weights of the first layer;

determine a second layer ratio between a second number of computation operations for a second layer of the model and a second number of weights of the second layer, the second layer ratio different from the first layer ratio;

compare the first layer ratio to a number of operations performed by a compute engine per unit of data;

compare the second layer ratio to the number of operations performed by the compute engine per the unit of data;

based on the comparisons, select a first dynamic batch size of the first layer of the model to be different than a second dynamic batch size of the second layer of the model after a determination that the first dynamic batch size provides better cache usage in a hardware circuit than a reference batch size of the model;

parallel batch process first inputs of the first layer of the model based on the first dynamic batch size; and parallel batch process second inputs of the second layer of the model based on the second dynamic batch size.

9. The at least one non-transitory machine-readable medium of claim 8, wherein the machine-readable instructions are to cause one or more of the at least one processor circuit to:

determine a number of operations that an accelerator can perform; and determine the operations per second of the compute engine based on the number of operations that the accelerator can perform.

10. The at least one non-transitory machine-readable medium of claim 8, wherein the machine-readable instructions are to cause one or more of the at least one processor circuit to intercept the model from a compiler, a neural network of the model including the first layer and the second layer.

11. The at least one non-transitory machine-readable medium of claim 10, wherein the machine-readable instructions are to cause one or more of the at least one processor circuit to extract parameter data from the first layer of the model, the parameter data including the weights of the first layer and activation tensors of the first layer.

12. The at least one non-transitory machine-readable medium of claim 11, wherein the machine-readable instructions are to cause one or more of the at least one processor circuit to determine the first number of computation operations of the first layer by combining a plurality of bit sizes corresponding to the activation tensors.

13. The at least one non-transitory machine-readable medium of claim 8, wherein the machine-readable instructions are to cause one or more of the at least one processor circuit to determine the second dynamic batch size of the second layer is equal to one after a determination that the second layer ratio is greater than the number of operations performed by the compute engine per the unit of data.

14. The at least one non-transitory machine-readable medium of claim 8, wherein the machine-readable instructions are to cause one or more of the at least one processor circuit to generate a dynamic batch schedule, the dynamic batch schedule including batch sizes for ones of a plurality of layers in a neural network of the model, the dynamic batch schedule using the first dynamic batch size of the first layer.

15. A method comprising:

selecting a first layer in a neural network, the first layer trained by hyperparameters to generate a prediction about input data;

determining a first layer ratio between a first number of computation operations of the first layer and a first number of weights of the first layer of the neural network;

determine a second layer ratio between a second number of computation operations for a second layer of the neural network and a second number of weights of the second layer, the second layer ratio different from the first layer ratio;

comparing the first layer ratio to a number of operations performed by a compute engine per unit of data;

comparing the second layer ratio to the number of operations performed by the compute engine per the unit of data; and based on the comparisons, selecting, by at least one processor circuit programmed by at least one instruction, a first dynamic batch size of the first layer of the neural network to be different than a second dynamic batch size of the second layer of the neural network after a determination that the first dynamic batch size provides better cache usage in a hardware circuit than a maximum batch size of the neural network;

parallel batch processing first inputs of the first layer of the neural network based on the first dynamic batch size; and parallel batch processing second inputs of the second layer of the neural network based on the second dynamic batch size.

16. The method of claim 15, further including:
determining a number of operations that an accelerator can perform; and
determining the operations per second of the compute engine based on the number of operations that the accelerator can perform.

17. The method of claim 15, further including intercepting the neural network from a compiler.

18. The method of claim 15, further including extracting parameter data from the first layer of the neural network, the parameter data including the weights of the first layer and activation tensors of the first layer.

19. The method of claim 18, further including determining the first number of computation operations of the first layer by combining a plurality of bit sizes corresponding to the activation tensors.

20. The method of claim 15, further including generating a dynamic batch schedule, the dynamic batch schedule including batch sizes for ones of a plurality of layers in the neural network, the dynamic batch schedule including the first dynamic batch size of the first layer.

21. An apparatus comprising:
layer operations circuitry to determine a first layer ratio between a first number of computation operations of a first layer of a model and a first number of weights of the first layer, and a second layer ratio between a second number of computation operations for a second layer of the model and a second number of weights of the second layer, the second layer ratio different from the first layer ratio;

comparator circuitry to:
compare the first layer ratio to a number of operations performed by a compute engine per unit of data; and
compare the second layer ratio to the number of operations performed by the compute engine per the unit of data; and batch size determination circuitry to:
based on the comparisons, select a first dynamic batch size of the first layer of the model to be different than a second dynamic batch size of the second layer of the model after a determination that the first dynamic batch size provides better cache usage in a hardware circuit than a reference batch size of the model;
generate first instructions to cause parallel batch processing of first inputs of the first layer of the model based on the first dynamic batch size; and
generate second instructions to cause parallel batch processing of second inputs of the second layer of the model based on the second dynamic batch size.

22. The apparatus of claim 21, including engine characteristics circuitry to:
determine a number of operations that an accelerator can perform; and
determine the operations per second of the compute engine based on the number of operations that the accelerator can perform.

23. The apparatus of claim 21, further including extraction circuitry to extract parameter data from the first layer of a neural network of the model, the parameter data including the weights of the first layer and activation tensors of the first layer.

24. The apparatus of claim 21, wherein the layer operations circuitry is to determine the first number of computation operations of the first layer by combining a plurality of bit sizes corresponding to activation tensors.

25. The apparatus of claim 21, wherein the batch size determination circuitry to is to determine the second dynamic batch size of the second layer is equal to one after a determination that the second layer ratio is greater than the number of operations performed by the compute engine per the unit of data.

* * * * *

UNITED STATES PATENT AND TRADEMARK OFFICE
CERTIFICATE OF CORRECTION

| | | |
|---|---|---|
| PATENT NO. | : 12,124,941 B2 | Page 1 of 1 |
| APPLICATION NO. | : 16/832601 | |
| DATED | : October 22, 2024 | |
| INVENTOR(S) | : Eric Luk et al. | |

It is certified that error appears in the above-identified patent and that said Letters Patent is hereby corrected as shown below:

In the Claims

In Column 32, Claim 25, Line 42, delete "to is" and insert -- is --, therefor.

Signed and Sealed this
Twenty-sixth Day of November, 2024

*Katherine Kelly Vidal*

Katherine Kelly Vidal
*Director of the United States Patent and Trademark Office*